(12) United States Patent
Freed et al.

(10) Patent No.: US 9,848,249 B2
(45) Date of Patent: Dec. 19, 2017

(54) LOCATION BASED TARGETED ADVERTISING

(71) Applicant: EchoStar Technologies L.L.C., Englewood, CO (US)

(72) Inventors: James Freed, Denver, CO (US); Neale Hall, West Yorkshire (GB)

(73) Assignee: Echostar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/942,451

(22) Filed: Jul. 15, 2013

(65) Prior Publication Data

US 2015/0020097 A1    Jan. 15, 2015

(51) Int. Cl.
| | | |
|---|---|---|
| *H04N 7/10* | (2006.01) | |
| *H04N 7/025* | (2006.01) | |
| *H04N 21/81* | (2011.01) | |
| *H04N 21/2668* | (2011.01) | |
| *H04N 21/258* | (2011.01) | |
| *H04N 21/44* | (2011.01) | |

(52) U.S. Cl.
CPC ..... *H04N 21/812* (2013.01); *H04N 21/25841* (2013.01); *H04N 21/25883* (2013.01); *H04N 21/2668* (2013.01); *H04N 21/44004* (2013.01)

(58) Field of Classification Search
CPC ............. H04N 21/812; H04N 21/2668; H04N 21/25883; H04N 21/25841; H04N 21/44222; H04N 7/163; H04N 7/17318; H04N 21/25891; H04H 60/45; H04H 60/32; H04H 60/43
USPC .............................. 725/34, 35, 10, 11, 12, 46
See application file for complete search history.

(56) References Cited

U.S. PATENT DOCUMENTS

| | | |
|---|---|---|
| 6,005,562 A | 12/1999 | Shiga et al. |
| 6,177,931 B1 | 1/2001 | Alexander et al. |
| 6,681,396 B1 | 1/2004 | Bates et al. |
| 7,174,512 B2 | 2/2007 | Martin et al. |
| 7,197,715 B1 | 3/2007 | Valeria |
| 7,633,887 B2 | 12/2009 | Panwar et al. |
| 7,680,894 B2 | 3/2010 | Diot et al. |

(Continued)

FOREIGN PATENT DOCUMENTS

| | | |
|---|---|---|
| EP | 1 865 716 A2 | 12/2007 |
| EP | 2 309 733 B1 | 4/2011 |

(Continued)

OTHER PUBLICATIONS

Extended European Search Report for EP 11166892.7 dated Oct. 6, 2011, 7 pages.

(Continued)

*Primary Examiner* — Nnenna Ekpo
(74) *Attorney, Agent, or Firm* — Kilpatrick Townsend & Stockton LLP

(57) ABSTRACT

Systems and methods for providing targeted advertising to media display devices that may be located away from a user premises based on user preferences. A computing system may detect presence of multiple user devices within a proximity of the computing system, and a user profile associated with each particular user device may then be accessed. A net demographic profile associated with the multiple user devices may be determined, and then advertising content may be selected for presentation by a display device based upon the net demographic profile.

18 Claims, 8 Drawing Sheets

(56) References Cited

U.S. PATENT DOCUMENTS

| | | |
|---|---|---|
| 7,774,811 B2 | 8/2010 | Poslinski et al. |
| 7,818,368 B2 | 10/2010 | Yang et al. |
| 7,825,989 B1 | 11/2010 | Greenberg |
| 7,849,487 B1 | 12/2010 | Vosseller |
| 8,024,753 B1 | 9/2011 | Kummer et al. |
| 8,046,798 B1 * | 10/2011 | Schlack et al. ............... 725/46 |
| 8,079,052 B2 | 12/2011 | Chen et al. |
| 8,104,065 B2 | 1/2012 | Aaby et al. |
| 8,209,713 B1 | 6/2012 | Lai et al. |
| 8,296,797 B2 | 10/2012 | Olstad et al. |
| 8,312,486 B1 | 11/2012 | Briggs et al. |
| 8,424,041 B2 | 4/2013 | Candelore et al. |
| 8,427,356 B1 | 4/2013 | Satish |
| 8,627,349 B2 | 1/2014 | Kirby et al. |
| 8,667,527 B2 * | 3/2014 | Yan ................ H04L 12/1881 |
| | | 725/32 |
| 8,689,258 B2 | 4/2014 | Kemp |
| 8,752,084 B1 | 6/2014 | Lai et al. |
| 8,855,681 B1 * | 10/2014 | George ................ H04W 4/02 |
| | | 455/456.1 |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,066,156 B2 | 6/2015 | Kapa |
| 9,213,986 B1 | 12/2015 | Buchheit et al. |
| 9,253,533 B1 | 2/2016 | Morgan et al. |
| 9,264,779 B2 | 2/2016 | Kirby et al. |
| 9,420,333 B2 | 8/2016 | Martch et al. |
| 9,565,474 B2 | 2/2017 | Petruzzelli et al. |
| 9,602,875 B2 | 3/2017 | Hussain |
| 9,609,379 B2 | 3/2017 | Martch et al. |
| 2001/0013123 A1 | 8/2001 | Freeman et al. |
| 2001/0026609 A1 | 10/2001 | Weinstein et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0090198 A1 | 7/2002 | Rosenberg et al. |
| 2002/0174430 A1 | 11/2002 | Ellis et al. |
| 2002/0178444 A1 | 11/2002 | Trajkovic et al. |
| 2003/0023742 A1 | 1/2003 | Allen et al. |
| 2003/0056220 A1 | 3/2003 | Thornton et al. |
| 2003/0066077 A1 | 4/2003 | Gutta et al. |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0154475 A1 | 8/2003 | Rodriguez et al. |
| 2003/0172376 A1 | 9/2003 | Coffin, III |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0181807 A1 | 9/2004 | Theiste et al. |
| 2005/0030977 A1 | 2/2005 | Casey et al. |
| 2005/0044570 A1 | 2/2005 | Poslinski |
| 2005/0071865 A1 | 3/2005 | Martins |
| 2005/0091690 A1 | 4/2005 | Delpuch et al. |
| 2005/0125302 A1 | 6/2005 | Brown et al. |
| 2005/0152565 A1 | 7/2005 | Jouppi et al. |
| 2005/0166230 A1 | 7/2005 | Gaydou et al. |
| 2005/0180568 A1 | 8/2005 | Krause |
| 2005/0191041 A1 | 9/2005 | Braun et al. |
| 2005/0240961 A1 | 10/2005 | Jerding et al. |
| 2005/0264705 A1 | 12/2005 | Kitamura |
| 2006/0020962 A1 | 1/2006 | Stark et al. |
| 2006/0085828 A1 | 4/2006 | Dureau et al. |
| 2006/0089870 A1 * | 4/2006 | Myhr ................ G06Q 30/02 |
| | | 705/14.5 |
| 2006/0174277 A1 | 8/2006 | Sezan et al. |
| 2006/0190615 A1 | 8/2006 | Panwar et al. |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde, Jr. |
| 2007/0033616 A1 | 2/2007 | Gutta |
| 2007/0058930 A1 | 3/2007 | Iwamoto |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0169165 A1 | 7/2007 | Crull et al. |
| 2007/0188655 A1 | 8/2007 | Ohta |
| 2007/0199040 A1 | 8/2007 | Kates |
| 2007/0204302 A1 | 8/2007 | Calzone |
| 2007/0226766 A1 | 9/2007 | Poslinski et al. |
| 2007/0245379 A1 | 10/2007 | Agnihortri |
| 2007/0288951 A1 | 12/2007 | Ray et al. |
| 2008/0022012 A1 | 1/2008 | Wang |
| 2008/0060006 A1 | 3/2008 | Shanks et al. |
| 2008/0086743 A1 | 4/2008 | Cheng et al. |
| 2008/0097949 A1 | 4/2008 | Kelly et al. |
| 2008/0109307 A1 * | 5/2008 | Ullah ................ G06Q 30/02 |
| | | 705/14.66 |
| 2008/0134043 A1 | 6/2008 | Georgis et al. |
| 2008/0163305 A1 | 7/2008 | Johnson et al. |
| 2008/0195457 A1 * | 8/2008 | Sherman et al. ............... 705/10 |
| 2008/0235348 A1 | 9/2008 | Dasgupta |
| 2008/0239169 A1 | 10/2008 | Moon et al. |
| 2008/0244666 A1 | 10/2008 | Moon et al. |
| 2008/0270038 A1 | 10/2008 | Partovi et al. |
| 2008/0300982 A1 * | 12/2008 | Larson ............ G06Q 30/0239 |
| | | 705/14.39 |
| 2008/0320523 A1 | 12/2008 | Morris et al. |
| 2009/0044217 A1 * | 2/2009 | Lutterbach ........ H04H 20/103 |
| | | 725/34 |
| 2009/0055385 A1 | 2/2009 | Jeon et al. |
| 2009/0102984 A1 | 4/2009 | Arling et al. |
| 2009/0138902 A1 | 5/2009 | Kamen |
| 2009/0178071 A1 | 7/2009 | Whitehead |
| 2009/0210898 A1 | 8/2009 | Childress et al. |
| 2009/0228911 A1 | 9/2009 | Vrijsen |
| 2009/0234828 A1 | 9/2009 | Tu |
| 2009/0249412 A1 | 10/2009 | Bhogal et al. |
| 2009/0293093 A1 | 11/2009 | Igarashi |
| 2009/0299824 A1 | 12/2009 | Barnes, Jr. |
| 2009/0325523 A1 | 12/2009 | Choi |
| 2010/0040151 A1 | 2/2010 | Garrett |
| 2010/0064306 A1 | 3/2010 | Tiongson et al. |
| 2010/0071007 A1 | 3/2010 | Meijer |
| 2010/0071062 A1 | 3/2010 | Choyi et al. |
| 2010/0089996 A1 | 4/2010 | Koplar |
| 2010/0115554 A1 | 5/2010 | Drouet et al. |
| 2010/0122294 A1 | 5/2010 | Craner |
| 2010/0125864 A1 | 5/2010 | Dwyer et al. |
| 2010/0146560 A1 | 6/2010 | Bonfrer |
| 2010/0153983 A1 * | 6/2010 | Philmon ............ H04H 20/106 |
| | | 725/13 |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0262986 A1 | 10/2010 | Adimatyam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Morita |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0082858 A1 | 4/2011 | Yu et al. |
| 2011/0109801 A1 | 5/2011 | Thomas et al. |
| 2011/0173337 A1 | 7/2011 | Walsh et al. |
| 2011/0202956 A1 | 8/2011 | Connelly et al. |
| 2011/0206342 A1 | 8/2011 | Thompson et al. |
| 2011/0239249 A1 | 9/2011 | Murison et al. |
| 2011/0243533 A1 | 10/2011 | Stern et al. |
| 2011/0252451 A1 | 10/2011 | Turgeman et al. |

(56) References Cited

U.S. PATENT DOCUMENTS

| | | |
|---|---|---|
| 2011/0286721 A1 | 11/2011 | Craner |
| 2011/0289410 A1 | 11/2011 | Paczkowski et al. |
| 2011/0293113 A1 | 12/2011 | McCarthy |
| 2011/0295667 A1 | 12/2011 | Butler |
| 2012/0020641 A1 | 1/2012 | Sakaniwa et al. |
| 2012/0052941 A1* | 3/2012 | Mo ............... G06Q 30/0251 463/30 |
| 2012/0060178 A1 | 3/2012 | Minakuchi et al. |
| 2012/0106932 A1 | 5/2012 | Grevers, Jr. |
| 2012/0110615 A1 | 5/2012 | Kilar et al. |
| 2012/0110616 A1 | 5/2012 | Kilar et al. |
| 2012/0124625 A1 | 5/2012 | Foote et al. |
| 2012/0131613 A1 | 5/2012 | Ellis et al. |
| 2012/0185895 A1 | 7/2012 | Wong et al. |
| 2012/0204209 A1 | 8/2012 | Kubo |
| 2012/0230651 A1 | 9/2012 | Chen |
| 2012/0246672 A1 | 9/2012 | Sridhar et al. |
| 2012/0260295 A1 | 10/2012 | Rondeau |
| 2012/0278834 A1 | 11/2012 | Richardson |
| 2012/0278837 A1 | 11/2012 | Curtis et al. |
| 2012/0284745 A1 | 11/2012 | Strong |
| 2012/0311633 A1 | 12/2012 | Mandrekar et al. |
| 2013/0014159 A1 | 1/2013 | Wiser et al. |
| 2013/0031216 A1 | 1/2013 | Willis et al. |
| 2013/0055304 A1 | 2/2013 | Kirby et al. |
| 2013/0061313 A1 | 3/2013 | Cullimore et al. |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |
| 2013/0145023 A1 | 6/2013 | Li et al. |
| 2013/0174196 A1* | 7/2013 | Herlein ............... 725/35 |
| 2013/0194503 A1 | 8/2013 | Yamashita |
| 2013/0263189 A1 | 10/2013 | Garner |
| 2013/0283162 A1 | 10/2013 | Aronsson et al. |
| 2013/0291037 A1 | 10/2013 | Im et al. |
| 2013/0298115 A1 | 11/2013 | Leske et al. |
| 2013/0332962 A1 | 12/2013 | Moritz et al. |
| 2013/0346302 A1 | 12/2013 | Purves et al. |
| 2014/0032709 A1 | 1/2014 | Saussy et al. |
| 2014/0068675 A1 | 3/2014 | Mountain |
| 2014/0068692 A1 | 3/2014 | Archibong et al. |
| 2014/0114966 A1 | 4/2014 | Bilinski et al. |
| 2014/0123160 A1 | 5/2014 | van Coppenolle et al. |
| 2014/0139555 A1 | 5/2014 | Levy |
| 2014/0140680 A1 | 5/2014 | Jo |
| 2014/0150009 A1 | 5/2014 | Sharma |
| 2014/0153904 A1 | 6/2014 | Adimatyam et al. |
| 2014/0157327 A1 | 6/2014 | Roberts et al. |
| 2014/0215539 A1 | 7/2014 | Chen et al. |
| 2014/0247931 A1* | 9/2014 | Swamy ............ H04W 4/20 379/204.01 |
| 2014/0282714 A1 | 9/2014 | Hussain |
| 2014/0282741 A1 | 9/2014 | Shoykhet |
| 2014/0282744 A1 | 9/2014 | Hardy et al. |
| 2014/0282745 A1 | 9/2014 | Chipman et al. |
| 2014/0282759 A1 | 9/2014 | Harvey et al. |
| 2014/0282779 A1 | 9/2014 | Navarro |
| 2014/0294201 A1 | 10/2014 | Johnson et al. |
| 2014/0310819 A1 | 10/2014 | Cakarel et al. |
| 2014/0313341 A1 | 10/2014 | Stribling |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1* | 11/2014 | Abihssira ......... H04N 21/25841 705/14.53 |
| 2014/0373079 A1 | 12/2014 | Friedrich et al. |
| 2015/0003814 A1 | 1/2015 | Miller |
| 2015/0040176 A1 | 2/2015 | Hybertson et al. |
| 2015/0052568 A1 | 2/2015 | Glennon et al. |
| 2015/0095932 A1 | 4/2015 | Ren |
| 2015/0118992 A1 | 4/2015 | Wyatt et al. |
| 2015/0181132 A1 | 6/2015 | Kummer et al. |
| 2015/0181279 A1 | 6/2015 | Martch et al. |
| 2015/0249803 A1 | 9/2015 | Tozer et al. |
| 2015/0249864 A1 | 9/2015 | Tang et al. |
| 2015/0310725 A1 | 10/2015 | Koskan et al. |
| 2015/0334461 A1 | 11/2015 | Yu |
| 2016/0066020 A1 | 3/2016 | Mountain |
| 2016/0066026 A1 | 3/2016 | Mountain |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli et al. |
| 2016/0191147 A1 | 6/2016 | Martch |
| 2016/0198229 A1 | 7/2016 | Keipert |
| 2016/0309212 A1 | 10/2016 | Martch et al. |

FOREIGN PATENT DOCUMENTS

| | | |
|---|---|---|
| EP | 2 403 239 A1 | 1/2012 |
| FR | 2 902 568 A1 | 12/2007 |
| JP | H10 322622 A | 12/1998 |
| JP | 2006-245745 A | 9/2006 |
| KR | 2004 0025073 A | 3/2004 |
| KR | 2006 0128295 A | 12/2006 |
| WO | 98/37694 A1 | 8/1998 |
| WO | 2005-059807 A2 | 6/2005 |
| WO | 2007/064987 A2 | 6/2007 |
| WO | 2007/098067 A1 | 8/2007 |
| WO | 2009/073925 A1 | 6/2009 |
| WO | 2011040999 A1 | 4/2011 |
| WO | 2013-016626 A1 | 1/2013 |
| WO | 2014/072742 A1 | 5/2014 |
| WO | 2014/164782 A1 | 10/2014 |
| WO | 2014/179017 A1 | 11/2014 |
| WO | 2016/030384 | 3/2016 |
| WO | 2016/030477 A1 | 3/2016 |
| WO | 2016/034899 A1 | 3/2016 |
| WO | 2016/055761 A1 | 4/2016 |

OTHER PUBLICATIONS

U.S. Appl. No. 13/919,702, filed Jun. 17, 2013 Final Office Action dated Nov. 18, 2014, 24 pages.
U.S. Appl. No. 13/834,916, filed Mar. 15, 2013 Final Office Action dated Jan. 12, 2015, 22 pages.
U.S. Appl. No. 13/886,873, filed May 3, 2013 Notice of Allowance dated Oct. 24, 2014, 40 pages.
U.S. Appl. No. 13/971,579, filed Aug. 20, 2013 Non Final Office Action dated Oct. 28, 2014, 35 pages.
U.S. Appl. No. 14/095,860, filed Dec. 3, 2013 Non-Final Office Action dated Dec. 26, 2014, 45 pages.
U.S. Appl. No. 14/200,864, filed Mar. 7, 2014 Non-Final Office Action dated Dec. 5, 2014, 35 pages.
Extended European Search Report for EP 14160140.1 dated Jul. 7, 2014, 7 pages.
International Search Report and Written Opinion for PCT/US2014/023466 dated Jul. 10, 2014, 15 pages.
International Search Report and Written Opinion of PCT/US2014/033796 dated Sep. 5, 2014, 12 pages.
U.S. Appl. No. 13/834,916, filed Mar. 15, 2013 Non Final Office Action dated Aug. 8, 2014, 19 pages.
U.S. Appl. No. 13/919,702, filed Jun. 17, 2013 Non Final Office Action dated Jun. 11, 2014, 25 pages.
U.S. Appl. No. 13/801,932, filed Mar. 13, 2013 Non Final Office Action dated Jun. 24, 2015, 21 pages.
U.S. Appl. No. 13/834,916, filed Mar. 15, 2013 Non Final Office Action dated Apr. 27, 2015, 22 pages.
U.S. Appl. No. 13/919,702, filed Jun. 17, 2013 Non-Final Office Action dated Apr. 30, 2015, 26 pages.
U.S. Appl. No. 14/071,613, filed Nov. 4, 2013 Non-Final Office Action dated May 18, 2015, 20 pages.
U.S. Appl. No. 14/095,860, filed Dec. 3, 2013 Final Office Action dated May 1, 2015, 18 pages.
U.S. Appl. No. 14/139,420, filed Dec. 23, 2013 Non-Final Office Action dated Apr. 30, 2015, 27 pages.
U.S. Appl. No. 14/200,864, filed Mar. 7, 2014, Final Office Action dated Jun. 18, 2015, 36 pages.
Jin S H et al., "Intelligent broadcasting system and services for personalized semantic contents consumption", Expert Systems With

(56) References Cited

OTHER PUBLICATIONS

Applications, Oxford, GB, vol. 31, No. 1, Jul. 1, 2006, pp. 164-173, XP024962718, ISSN: 0957-4174, DOI: 10.1016/J.ESWA.2005.09. 021.
Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
European Search Report for EP 14197940.1 dated Apr. 28, 2015, 13 pages.
International Preliminary Report on Patentability for PCT/US2014/ 023466 dated Sep. 15, 2015, 9 pages.
U.S. Appl. No. 14/095,860, filed Dec. 3, 2013 Notice of Allowance dated Jul. 13, 2015, 31 pages.
U.S. Appl. No. 14/071,613, filed Nov. 4, 2013 Final Office Action dated Oct. 8, 2015, 11 pages.
U.S. Appl. No. 13/971,579, filed Aug. 20, 2013 Notice of Allowance dated Feb. 27, 2015, 28 pages.
U.S. Appl. No. 14/470,248, filed Aug. 27, 2014, Preinterview first office action dated Sep. 4, 2015, 22 pages.
U.S. Appl. No. 14/470,279, filed Aug. 27, 2014, Preinterview first office action dated Aug. 26, 2015, 23 pages.
U.S. Appl. No. 14/479,007, filed Sep. 5, 2014, Non-Final Office Action dated Sep. 1, 2015, 44 pages.
U.S. Appl. No. 14/139,299, filed Dec. 23, 2013, Non Final Office Action dated Aug. 14, 2015, 39 pages.
U.S. Appl. No. 14/297,279, filed Jun. 5, 2014 Final Rejection dated Apr. 22, 2016, 33 pages.
U.S. Appl. No. 14/200,864, filed Mar. 7, 2014 Non-Final Office Action dated Feb. 18, 2016, 61 pages.
U.S. Appl. No. 14/479,007, filed Sep. 5, 2014, Final Office Action dated Feb. 22, 2016, 37 pages.
U.S. Appl. No. 14/139,299, filed Dec. 23, 2013, Final Office Action dated Feb. 25, 2016, all pages.
U.S. Appl. No. 14/139,420, filed Dec. 23, 2013 Notice of Allowance dated Mar. 31, 2016, 37 pages.
U.S. Appl. No. 14/470,392, filed Aug. 27, 2014 Final Office Action dated Mar. 4, 2016, all pages.
U.S. Appl. No. 14/470,415, filed Aug. 27, 2014 Final Office Action dated Mar. 3, 2016, all pages.
U.S. Appl. No. 13/801,932, filed Mar. 13, 2013 Non-Final Rejection dated May 20, 2016, 28 pages.
U.S. Appl. No. 14/470,279, filed Aug. 27, 2014, Final Office Action dated Jan. 22, 2016, 25 pages.
U.S. Appl. No. 14/591,474, filed Jan. 7, 2015, Non-Final Office Action dated Feb. 12, 2016, 32 pages.
U.S. Appl. No. 14/494,079, filed Sep. 23, 2014, Preinterview first office action dated Feb. 10, 2016, 6 pages.
U.S. Appl. No. 14/470,248, filed Aug. 27, 2014, Final Office Action dated Feb. 16, 2016, 26 pages.
International Search Report and Written Opinion for PCT/EP2015/ 069461 dated Oct. 1, 2015, 13 pages.
International Search Report and Written Opinion for PCT/EP2015/ 069456 dated Oct. 5, 2015, 11 pages.
International Preliminary Report on Patentability for PCT/US2014/ 033796 dated Nov. 3, 2015, 7 pages.
International Search Report and Written Opinion for PCT/EP2015/ 069681 dated Nov. 23, 2015, 12 pages.
U.S. Appl. No. 13/801,932, filed Mar. 13, 2013 Final Office Action dated Dec. 17, 2015, 23 pages.
U.S. Appl. No. 13/834,916, filed Mar. 15, 2013 Final Office Action dated Dec. 14, 2015, 31 pages.
U.S. Appl. No. 14/297,322, filed Jun. 5, 2014 Notice of Allowance dated Nov. 5, 2015, 34 pages.
U.S. Appl. No. 14/297,279, filed Jun. 5, 2014 Non-Final Office Action dated Nov. 5, 2015, 45 pages.
U.S. Appl. No. 14/095,860, filed Dec. 3, 2013 Notice of Allowance dated Oct. 19, 2015, 14 pages.
U.S. Appl. No. 13/919,702, filed Jun. 17, 2013 Final Office Action dated Dec. 31, 2015, 30 pages.
U.S. Appl. No. 14/470,392, filed Aug. 27, 2014 Non Final Office Action dated Nov. 5, 2015, 31 pages.
U.S. Appl. No. 14/470,415, filed Aug. 27, 2014 Non Final Office Action dated Nov. 18, 2015, 28 pages.
Office Action for EP 14160140.1 dated Jan. 19, 2016, 5 pages.
International Search Report and Written Opinion for PCT/GB2015/ 052570 dated Dec. 11, 2015, 13 pages.
U.S. Appl. No. 13/834,916, filed Mar. 15, 2013 Non-Final Rejection dated Aug. 18, 2016, all pages.
U.S. Appl. No. 14/470,248, filed Aug. 27, 2014, Non Final Office Action dated Jul. 25, 2016, all pages.
U.S. Appl. No. 14/470,279, filed Aug. 27, 2014, Non Final Office Action dated Jul. 19, 2016, all pages.
U.S. Appl. No. 14/479,007, filed Sep. 5, 2014, Non-Final Office Action dated Jul. 27, 2016, 37 pages.
U.S. Appl. No. 13/919,702, filed Jun. 17, 2013 Non Final Office Action dated Jun. 30, 2016, all pages.
U.S. Appl. No. 14/139,299, filed Dec. 23, 2013, Non Final Office Action dated Jun. 20, 2016, all pages.
U.S. Appl. No. 14/470,392, filed Aug. 27, 2014 Non-Final Office Action dated Aug. 5, 2016, all pages.
U.S. Appl. No. 14/470,415, filed Aug. 27, 2014 Non Final Office Action dated Jul. 29, 2016, all pages.
International Search Report and Written Opinion for PCT/GB2015/ 052456 dated Jun. 13, 2016, all pages.
U.S. Appl. No. 14/200,864, filed Mar. 7, 2014 Notice of Allow ance dated Sep. 15, 2016, all pages.
U.S. Appl. No. 13/834,916, filed Mar. 15, 2013 Final Office Action dated Mar. 13, 2017, all pages.
U.S. Appl. No. 14/297,279, filed Jun. 5, 2014 Non-Final Office Action dated Feb. 9, 2017, all pages.
U.S. Appl. No. 14/470,279, filed Aug. 27, 2014, Notice of Allowance dated Mar. 16, 2017, all pages.
U.S. Appl. No. 15/195,527, filed Jun. 28, 2016, Notice of Allowance dated Feb. 3, 2017, all pages.
U.S. Appl. No. 14/139,299, filed Dec. 23, 2013, Final Office Action dated Feb. 30, 2017, all pages.
U.S. Appl. No. 14/470,392, filed Aug. 27, 2014, Notice of Allowance dated Feb. 13, 2017, all pages.
U.S. Appl. No. 14/470,248, filed Aug. 27, 2014, Final Office Action dated Dec. 9, 2016, all pages.
U.S. Appl. No. 14/470,279, filed Aug. 27, 2014, Final Office Action dated Dec. 9, 2016, all pages.
U.S. Appl. No. 14/479,007, filed Sep. 5, 2014, Final Office Action dated Jan. 23, 2017, all pages.
U.S. Appl. No. 14/591,474, filed Jan. 7, 2015, Non-Final Office Action dated Dec. 16, 2016, 32 pages.
U.S. Appl. No. 15/195,527, filed Jun. 28, 2016, Non-Final Rejection dated Sep. 30, 2016, all pages.
U.S. Appl. No. 13/919,702, filed Jun. 17, 2013 Final Office Action dated Oct. 28, 2016, all pages.
U.S. Appl. No. 13/801,932, filed Mar. 13, 2013 Notice of Allowance dated Nov. 25, 2016, all pages.

\* cited by examiner

LOCATION BASED TARGETED ADVERTISING

BACKGROUND

Providers of video content and media services include terrestrial broadcasters, satellite broadcasters, cable broadcasters, and others. Such providers typically have users, who may subscribe for various services offered by the providers. Such users may have individual preferences regarding video and media content, purchasing habits, personal demographic data and other information that may be useful to a provider in determining relevent content and advertising to provide for users.

SUMMARY

This Summary does not in any way limit the scope of the claimed subject matter.

In an aspect, a computer-implemented method is disclosed. The method may include or comprise: detecting, by a computing system, presence of multiple user devices within a proximity of the computing system; accessing, for each particular user device of a plurality of user devices of the multiple user devices, a user profile that is associated with the particular user device; determining a net demographic profile associated with the multiple user devices; and selecting advertising content for presentation by a display device based upon the net demographic profile.

In an aspect, a television receiver is disclosed that may include or comprise: one or more processors; an advertising selection module; and memory containing instructions that when executed by the one or more processors cause the advertising selection module to: detect presence of multiple user devices within a proximity of the television receiver; access, for each particular user device within the proximity of the television receiver, over a communication system linked with the television receiver, a user profile that is associated with each particular user device; determine a net demographic profile associated with the multiple user devices based on information in accessed user profiles; and select advertising content for presentation by a display device based upon the net demographic profile.

In an aspect, a non-transitory processor-readable medium is disclosed that may include or comprise processor-readable instructions to cause one or more processors to: detect at a particular time presence of multiple user devices within a proximity of a television receiver; access, for each particular user device of a plurality of user devices of the multiple user devices, a user profile that is associated with each particular user device; determine a net demographic profile associated with the multiple user devices based on demographic information in accessed user profiles; select advertising content for presentation by a display device based upon the net demographic profile; output for presentation by the display device the selected advertising content; detect at another time following the particular time a changed presence of multiple user devices as a result of either of an entry into the proximity of the television receiver of a user device not initially among the multiple user devices, or an exit from the proximity of the television receiver of a user device initially among the multiple user devices; access at least one user profile, wherein each particular user profile of the at least one accessed user profile is associated with a particular user device among the changed presence of multiple user devices; update the net demographic profile using information in the accessed user profiles; select advertising content for presentation by a display device based upon the updated net demographic profile; and output for presentation by the display device the selected advertising content.

DETAILED DESCRIPTION

Figure 1:
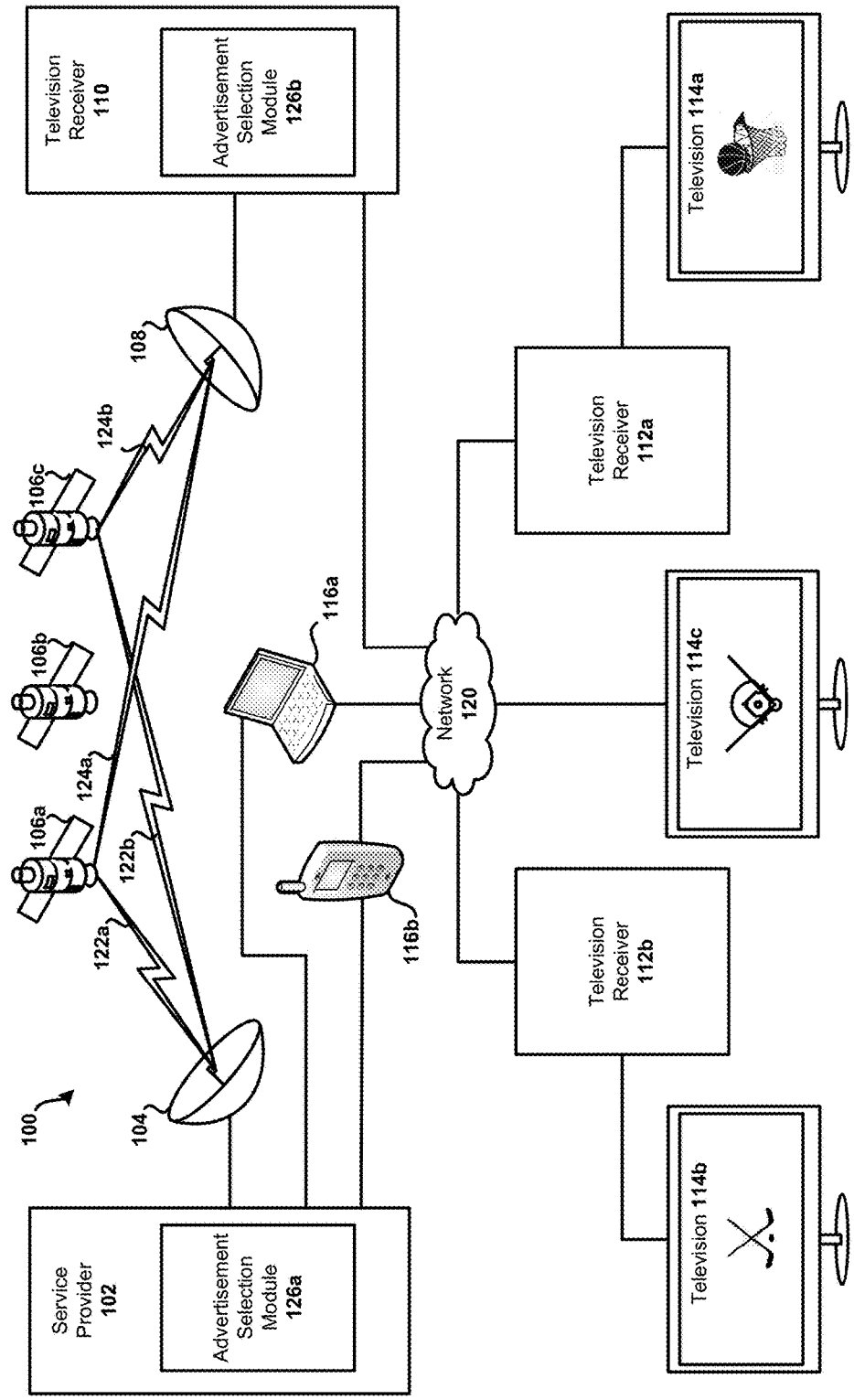
FIG. 1 shows an example media content distribution system in which aspects of the present disclosure may be implemented.

Embodiments disclosed herein relate to providing targeted advertising to media display devices that may be located away from a user's premises based on the user's preferences.

Video programming and data services may be transmitted by an entity, referred to as service provider (SP), to consumers. Examples of video programming include television shows, movies, music videos and other image data. The term program may herein refer to either a particular instance of such video programming, or to a group of such instances such as one episode of a television (TV) series or the series itself. Examples of data services may include data backup services, automatic bill payment, recommendations of programming, and personal programming recording and storage. Other programming and data services are possible.

Users of a SP often subscribe to the services of the SP. To receive the services of the SP, a user may have a television receiver (TR), such as a set top box, often located at the user's premises. The TR may receive signals by various technologies, for example by satellite transmission or over a cable connection, among others. The TR may be linked to a display device such as, for example, a high definition TV, a laptop computer or a mobile communication device such as a cellphone, smartphone, or personal digital assistant. The TR may be a physical part of a television or other device.

By subscribing to the services of the SP an individual user may provide personal demographic background information, for example, age, gender, or income, among other possibilities. Such information may also include user-provided information related to preferences for media content. For example, a user may inform the SP that certain categories of content are particularly desirable and/or that certain categories are to be blocked. The SP may infer other information about the user on the basis of the user's viewing selections. Further, the SP may obtain other available data on the user, such as credit reports and purchasing history.

The SP may be able to selectively deliver content to a TR for display for user. This may be done by programming the user's TR. As an example, during periods of low user usage of the TR, such as at night, the SP may transmit advertisements which are then stored on the TR. When the user later watches a particular program, advertisements may be selected from those stored in the TR, without having to be transmitted by the SP.

On the basis of the information about the user, a SP may produce a user profile (UP) that is associated to the user. With the UP, the SP may be able to provide more relevant advertising content within the programming content. The advertising selected by the SP may take into account what the user finds objectionable, and exclude certain advertisements. Alternatively, advertisements could be selected based on the user's known tastes, as inferred from the UP.

However, the TR by which an individual user obtains subscribed services is typically located only in one place, often the individual user's premises. But once the individual user is at an alternate location at which there is an alternate TR and display, the selected advertising appropriate for the individual user might not be available to the alternate TR. An example is when the individual user is at restaurant or airport lounge where the proprietor has subscribed to receive content from the SP on a local TR and to display it for customers. Further, at such an alternate location there may be multiple users present. Without being able to determine which users are viewing the displayed program, neither the TR nor the SP may be able to provide targeted advertising selected for any of the users.

If one or more users could be detected in proximity to a TR and display device at an alternate location that is associated to a different entity, then advertising selected for the users could be made available for display at the alternate location. Further, in the case that more than one user was simultaneously at the alternate location, any of a variety of algorithms could be used to adapt the displayed advertising at the alternate location on the basis of the UPs of each user. The advertising could be adapted on the basis of common interests of all the users at the alternate location, or could be chosen to alternate between advertising selected for individual users.

In accordance with the present disclosure, the presence of one or more users in proximity to a TR and display at a remote location may be detected by taking advantage of the commonplace nature of personal mobile devices, termed herein user devices, such as personal digital assistants, smartphones and cellphones, laptops, tablets, or other devices which users may have on their person. A TR at a public location may be equipped with a device detection module which detects a personal mobile device associated to a specific user. In some embodiments, the detection may be by radio signaling, such as WiFi, between the TR and the user's personal mobile device, or just user device. In alternative and additional embodiments, the user device and a service provider system may establish a communication link. For example, the user device may be configured to transmit a signal containing information about its location by a phone line link, by a cable link, by using a cellphone link, or by a wireless link, among other possibilities. The transmitted information transmitted by the user device may include the GPS coordinates of the user's location. This user location information may then be relayed to a TR associated a different entity and in proximity to the user.

Once one or more user devices have been detected by a TR, the TR may then associate each user device to a respective specific user and access the associated UP of the specific user. Using the UP, the TR may adapt the displayed advertising content to be more relevant to the user. In one embodiment, advertising content is stored at the TR. Once the UPs of the detected user or users are accessed, advertising content may be chosen from the content stored at the TR. The advertising content stored at the TR may be received from the SP, and also updated as needed. In one example, knowing that the TR and display were located at a sports bar, and an important game was to be played in the near future, the TR may receive and store advertisements relevant to the game and the anticipated users' demographics. This and other embodiments may ease the task of selecting stored advertising for detected users, the stored advertising may be more likely to contain the advertising content that best correlates with the UP of the detected users.

In additional and/or alternative embodiments, the TR may select the advertising content to display from advertising content that is part of the current transmission stream (e.g. downlinks) from the SP. Such transmissions streams may comprise a plurality of advertisements being transmitted simultaneously, and the TR could select for display an advertisement that most closely correlates with the UP.

In additional and/or alternative embodiments, the TR may detect that more than one user device is currently within a proximity of the TR. Such multiple user device detections may occur by any of the methods mentioned above. In the case that a TR has detected multiple user devices within the viewing proximity, the TR may then access respective associated UPs for some or all or some of the detected multiple user devices. On the basis of the accessed UPs, the TR form a net demographic profile based on the demographic information contained in the accessed UPs. Different analyses and algorithms may be used to form the net demographic profile. Non-limiting examples include averaging ages, forming a ratio of genders, averaging incomes, and intersecting known content preferences. Other particular data may be included in the net demographic profile, and other methods for producing the data in the net demographic profile may be used. The analyses and algorithms used to perform the net demographic profile may be performed by the SP and the results transmitted to the TR. Once the net demographic data has been determined, the TR may select advertising content on the basis of the net demographic profile. Alternatively, the TR may form categories of selected advertisements, and select alternately from which category an advertisement is chosen at any one time for display. In another embodiment, the SP may select the advertising content and transmit the selections to the TR.

In another embodiment, a user device may maintain a local copy of the user's UP, or download a local copy periodically from the SP. When a TR at an alternate location detects the user device, the user device may be configured to transmit the local copy of the UP to the TR, so that the TR can access the UP without establishing a communication link with the SP.

The following description describes various exemplary embodiments by which targeted advertising may be provided to a user even at an alternate location, based on the UP of the user.

Referring now to FIG. 1, an example media content distribution system 100 is shown in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The example system 100 may include a service provider 102, a satellite uplink 104, a plurality of orbiting (e.g., geosynchronous) satellites 106a-c, a satellite dish 108, a PTR (Primary Television Receiver) 110, a plurality of secondary television receivers 112a-b, a plurality of televisions 114a-c, and a plurality of computing devices 116a-b. In the present example, the PTR 110 may at least include an advertisement selection module 126b. The advertisement selection module 126b in one embodiment may be configured to access a UP, as discussed below. The advertisement selection module 126b may be implemented as computer code that is executed by one or more processors within either the PTR or a secondary television receiver. In another embodiment, the advertising selection module may be implemented either as firmware or dedicated hardware. Similarly, the service provide 102 may include an advertisement selection module 126a, which may be configured to provide access to a UP, and provide advertising content for either the PTR 110 or a secondary television receiver 112a-b.

The system 100 may also include at least one network 120 that establishes a bi-directional communication path for data transfer between and among the PTR 110, secondary television receivers 112a-b, televisions 114a-c, and computing devices 116a-b of the example system 100. In some embodiments, the network 120 may further establish a bi-directional communication path (not shown) for data transfer between the PTR 110 and the service provider 102. The network 120 is intended to represent any number of terrestrial and/or non-terrestrial network features or elements. For example, the network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the example system 100.

The computing devices 116a-b, called user devices, may include laptop computers, notebook computers, cellphones, personal digital assistant devices or other electronic devices capable of making a connection to a network 120. Such a user device may be configured to make a communication link directly with the PTR 110, or a secondary television receiver 112a-b. In additional and alternative embodiments, the computing devices 116a-b may be configured to establish a communication link with the service provider without using the network 120. Such an alternative communication link may be a cellphone link, a cable or fiber optic link, or a wireless link. Other alternative communication links will be known to one skilled in the art.

The PTR 110, and the secondary television receivers 112a-b, as described throughout may generally be any type of TR, such as a STB (Set Top Box) for example. In another example, the PTR 110, and the secondary television receivers 112a-b, may exhibit functionality integrated as part of or into a television, a DVR, a computing device, such as a tablet computing device, or any other computing system or device, as well as variations thereof. Further, the PTR 110 and the network 120, together with the secondary television receivers 112a-b, televisions 114a-c, and computing devices 116a-b, may form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In practice, the satellites 106a-c may be configured to receive uplink signals 122a-b from the satellite uplink 104. In this example, the uplink signals 122a-b may contain one or more transponder streams of particular data or content, such as particular television channel, that is supplied by the service provider 102. For example, each of the respective uplink signals 122a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 106a-c. Further, different media content may be carried using different transponders of a particular satellite (e.g., satellite 106a); thus, such media content may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, and etc.

The satellites 106a-c may further be configured to relay the uplink signals 122a-b to the satellite dish 108 as downlink signals 124a-b. Similar to the uplink signals 122a-b, each of the downlink signals 124a-b may contain one or more transponder streams of particular data or content, such as various encoded and/or at least partially electronically scrambled television channels, on-demand programming, etc., in accordance with an allotted carrier frequency and bandwidth. The downlink signals 124a-b, however, may not necessarily contain the same or similar content as a corresponding one of the uplink signals 122a-b. For example, the uplink signal 122a may include a first transponder stream containing at least a first group or grouping of television channels, and the downlink signal 124a may include a second transponder stream containing at least a second, different group or grouping of television channels. In other examples, the first and second group of television channels may have one or more television channels in common. In sum, there may be varying degrees of correlation between the uplink signals 122a-b and the downlink signals 124a-b, both in terms of content and underlying characteristics.

Continuing with the example implementation scenario, the satellite dish 108 may be provided for use to receive television channels, such as on a subscription basis, provided by the service provider 102, satellite uplink 104, and/or satellites 106a-c. For example, the satellite dish 108 may be configured to receive particular transponder streams, or downlink signals 124a-b, from one or more of the satellites 106a-c. Based on the characteristics of the PTR 110 and/or satellite dish 108, however, it may only be possible to capture transponder streams from a limited number of transponders concurrently. For example, a tuner of the PTR 110 may only be able to tune to a single transponder stream from a transponder of a single satellite, such as satellite 106a, at a time.

Additionally, the PTR 110, which is communicatively coupled to the satellite dish 108, may subsequently select via tuner (see e.g., FIG. 3), decode, and relay particular transponder streams to the television 114c for display thereon. For example, the satellite dish 108 and the PTR 110 may, respectively, be configured to receive, decode, and relay at least one premium HD-formatted television channel to the television 114c. Programming or content associated with the HD channel may generally be presented "live," or from a recording as previously stored on, by, or at the PTR 110. In this example, the HD channel may be output to the television 114c in accordance with the HDMI/HDCP content protection technologies. Other embodiments are possible. For example, in some embodiments, the HD channel may be output to the television 114c in accordance with the MoCA® (Multimedia over Coax Alliance) home entertainment networking standard. Still other embodiments are possible.

Further, the PTR 110 may select via tuner, decode, and relay particular transponder streams to one or both of the secondary television receivers 112a-b, which may in turn relay particular transponder streams to a corresponding one of the television 114a and the television 114a for display thereon. For example, the satellite dish 108 and the PTR 110 may, respectively, be configured to receive, decode, and relay at least one television channel to the television 114a by way of the secondary television receiver 112a. Similar to the above-example, the television channel may generally be presented "live," or from a recording as previously stored on the PTR 110, and may be output to the television 114a by way of the secondary television receiver 112a in accordance with a particular content protection technology and/or networking standard. Other embodiments are possible.

Still further, the satellite dish 108 and the PTR 110 may, respectively, be configured to receive, decode, and relay at least one premium television channel to one or both of the computing devices 116a-b. Similar to the above-examples, the television channel may generally be presented "live," or from a recording as previously stored on the PTR 110, and may be output to one or both of the computing devices 116a-b in accordance with a particular content protection technology and/or networking standard. Other embodiments are possible.

Figure 2:
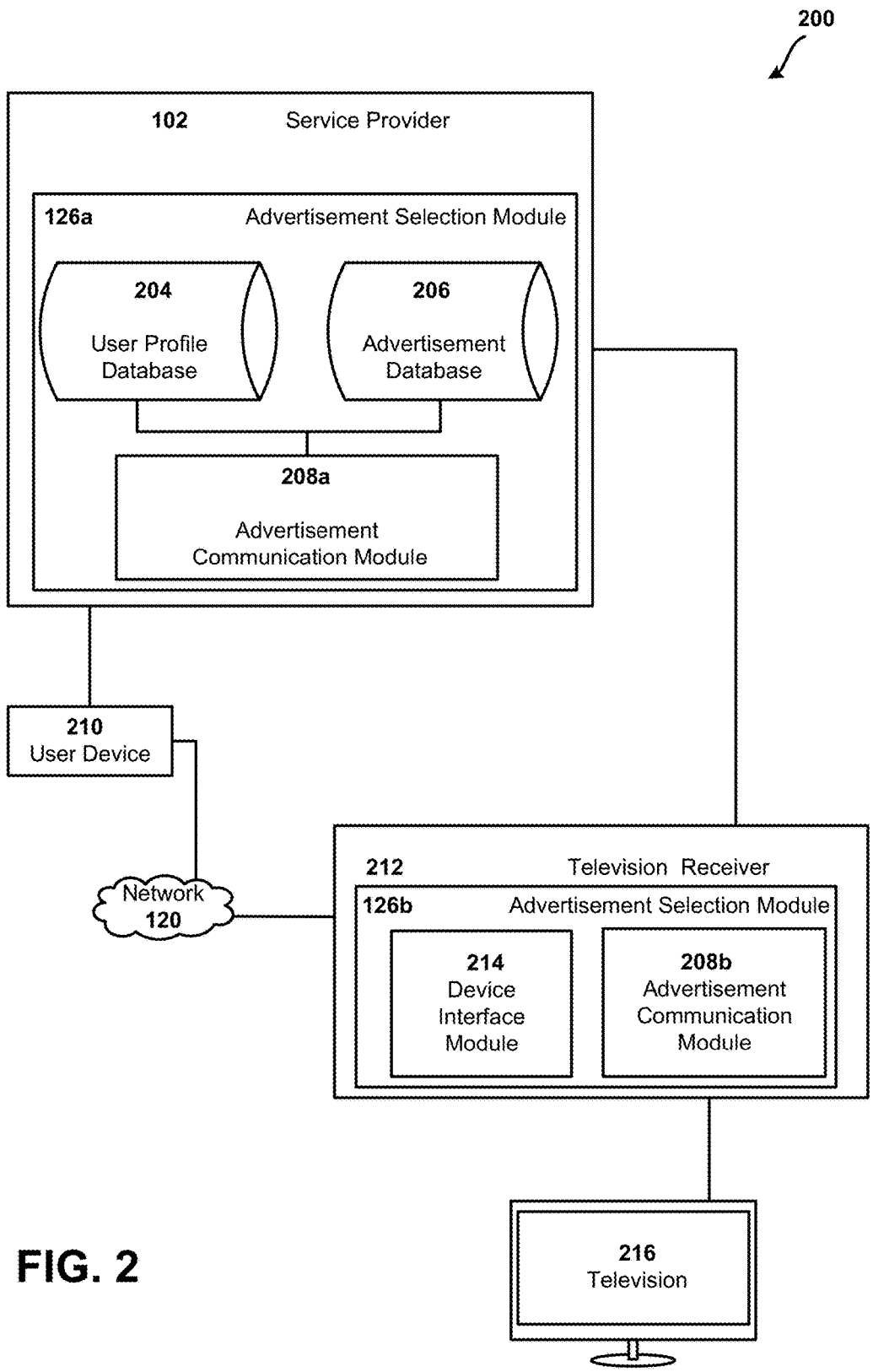
FIG. 2 shows aspects of an example embodiment of the system of FIG. 1.

Referring now to FIG. 2, an example embodiment 200 is shown for elements of service provider 102 and of TR 212. The TR 212 may be either a PTR 110 or a secondary television receiver 112a-b. The TR 212 is communicatively linked with at least one television 216. The user device 210 may be either of the computing devices 116a-b as described above, or a mobile device configured to form a direct communication link with either the service provider 102, or the TR 212 through the network 120.

The advertisement selection module 126a may include a user profile database 204, an advertisement database 206, and an advertisement communication module 208a. The user profile database may store information about individual users of the service provider 102. Such information may be based on personal demographic data, observed viewing history, user-supplied preferences, and other available information about the user. Information in each UP in the user profile database may be specific to only one user, or it may be specific to a particular group of users, such as a family.

The advertisement database 206 may include advertising content that the service provider is configured to provide to users. The advertising content may be stored over several devices in various locations. The advertising content may also be organized into content categories for correlation with categories of user preferences maintained in user profiles.

The advertisement communication module (ACM) 208a may be configured to correlate user profile information and preferences stored in the user profile database 204 with advertising content stored in the advertisement database 206. The ACM 208a may be configured to receive requests for a UP from a TR, and to transmit the UP to the TR. The ACM 208a may also be configured to form a communication link with a user device 210, and over the communication link the ACM may receive location information regarding the proximity of the user device 210 to the TR 212. Such location information may include global positioning system (GPS) data. Upon receiving the location information from the user device 210, the ACM 208a may be able to determine that the user device is within a viewing proximity of a particular TR 212. The ACM 208a may then transmit to the particular TR 212 the UP associated with the user device 210.

The ACM 208a may also be configured to form a direct communication link with the TR 212, such as by a satellite link as described in relation to FIG. 1, or by other means such as a cellphone link, cable link, wireless link, or a fiber optic link. The ACM 208a may transmit advertising content to the TR 212 over the direct communication link, which the TR 212 may display in real-time, or may store for later display.

In the illustrated exemplary embodiment 200, the TR 212 includes an advertisement selection module 126b which performs detection of a user device 210. The detection may be performed using a device interface module 214, which may be a hardware device, or a component of computer software. The advertisement selection module 126b may interface with the service provider 102 using an ACM 208b. The ACM 208b may comprise different elements than the ACM 208a of the service advertisement selection module 126a.

The user device 210 and the TR 212 may be configured to form a communication link over the network 120 as described above. Once the TR 212 detects the user device 210 by establishing a communication link with user device 210, the TR 212 communicates with service provider 102 to identify the UP associated with the user device 210. Using the identified UP, the advertisement selection module 126a of the service provider 102 selects advertising content from the advertisement database 206 to transmit to the TR 212 for display. The TR 212 may receive and display the selected advertising in real time. Alternatively, the selected advertising may be locally stored in the TR 212 for display at a later opportunity.

Figure 3:
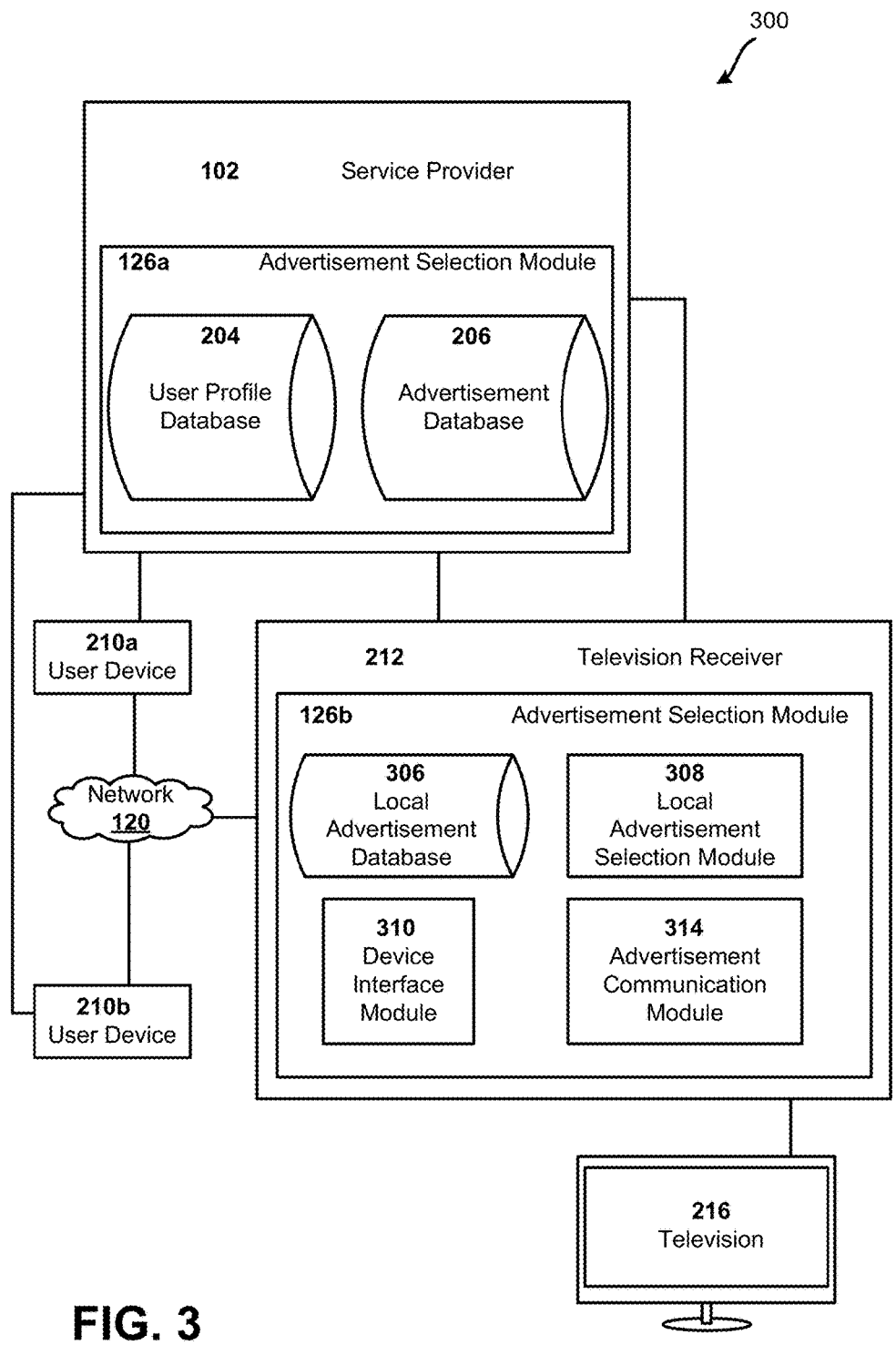
FIG. 3 shows aspects of another example embodiment of the system of FIG. 1.

Referring now to FIG. 3, another example embodiment 300 is shown for elements of service provider 102 and of TR 212. The TR 212 may correspond to either the PTR 110 or one or more of the secondary television receivers 112a-b. The TR 212 is communicatively linked with at least one television 216.

In one embodiment, there may also be two direct links between the TR and the SP. One may be a link used for delivering programming content to the TR, such as a downlink signals 124a-b, and an alternate link between the TR and the SP. The alternate link may be used for transmission and reception of synchronization messages, billing information, or other messages. The alternate link may also function as a backup programming delivery link. As discussed below, the alternate link may be used by the SP to deliver advertising content to the TR. The alternate link use any of the technologies previously disclosed; examples include a fiber optic or cable connections, a cellphone connection or a DSL connection.

The user devices 210a-b may be either of the computing devices 116a-b as described above, or a mobile device configured to form a communication link with either the service provider 102, or the TR 212 through the network 120.

As now described, variations on the configuration are possible. FIG. 3 shows additional and/or alternative configurations of the devices and modules which may be used to implement methods of the present disclosure. In the embodiments shown in FIG. 3, the advertisement selection module 126a includes the user profile database 204 and the advertisement database 206, as described above in reference to FIG. 2. Further, the advertisement selection module 126b may include a local advertisement database 306, a local advertisement selection module 308, a device interface module 310, and an advertising communication module 314.

The local advertising database 306 may store advertising content received from the service provider 102. The advertising content in local advertising database 306 may be received by the TR 212 during periods of low or no programming display, and may comprise advertising from the advertisement database 206 of the service provider 102. It may also be included in a programming stream from the service provider 102, and the local advertising selection module 308 may determine when which advertising content included in the programming stream is intended for the TR 212.

As mentioned above, the advertisement selection module 126b of the TR 212 may include the device interface module 310 that is configured to form communication links with a plurality of user devices 210a-b over the network 120. The communication links between the TR 212 and each of the plurality of user devices 210a-b may be as described above in reference FIG. 2. Also, the advertisement selection module 126b of the TR 212 may include the advertisement communication module 314 by which the advertisement selection module 126b communicates with the service provider 102 to access a UP for each detected user device 210a-b.

Figure 4:
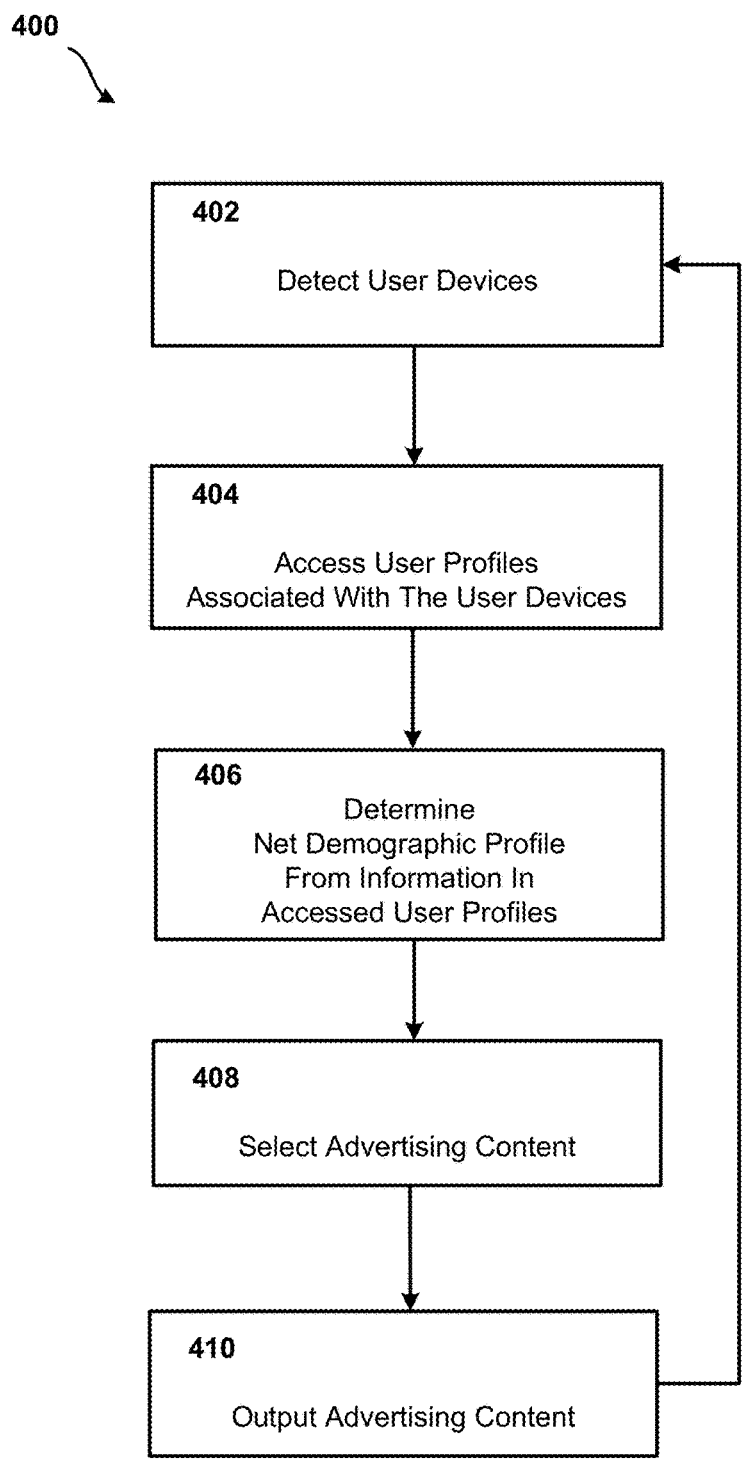
FIG. 4 shows a first example method in accordance with the present disclosure.

Referring now to FIG. 4, a first example method 400 is shown in accordance with the present disclosure. In particular, the method 400 provides an example implementation of or for delivering advertising, targeted to at least one user of an SP, to a TR at a location not associated with the user or users. At the location there may be a TR and a display device, such as a television. The TR has at least one communication link with an SP, which may be any of the communication links previously discussed. The TR may be configured to detect and receive the presence of mobile devices of the users.

At 402, the TR may detect a number of user devices within a distance or proximity of the TR. The proximity may be selectively chosen based on factors such as the viewing area of the television, the range in which the TR can detect a mobile user device, and regulatory limits. Other factors may also be used. In one embodiment, detection may occur by a user device transmitting an identifying signal. An example of this is when the user device is configured to passively transmit a beacon signal at regular intervals. In one example, the user of the user device may be able prevent the user device from performing such signaling. This would allow the user the option of reducing power consumption and maintaining privacy. The signaling may be limited in power so that a range in which the signal is received is limited, so that only a TR within range to the user device would be able to receive the signal.

The identifying signal transmitted by a particular user device may contain device information sufficient to identify the user device specifically, or may have limited content sufficient only to indicate that a user device is within the proximity. In the first case, a TR that receives the specific device identifying signal has then detected the user device. In the second case, a TR that receives a limited content signal may then transmit a response signal indicating the limited content was received and requesting that the user device transmit a further signal containing information for the TR to uniquely identify the user device.

In another embodiment, the detection of a particular user device in proximity to a TR may be initiated by the TR regularly transmitting a beacon signal configured to elicit a response from a user device in the proximity. In response to receiving such a beacon signal from the TR, a user device in the proximity may be configured to automatically reply with an identification signal. This user device identification signal may contain sufficient information for the TR to uniquely determine the user device, or may only be a reply beacon signal. In the latter case, the TR may then transmit a signal requesting an identification signal be sent by the user device.

In another embodiment, a particular user device may regularly transmits signals to the SP over a direct link. Examples of such signaling include a cellphone transmitting over a cellphone connection, and a laptop communicating over an Internet link with the SP. Other embodiments are possible. The information in the messages sent from a particular user device to the SP may contain information sufficient for the SP to determine that the user device is in the proximity of a TR. The SP may then transmit a message to the TR that informs the TR of the presence of the user device within proximity of the TR.

At 404, when a particular user device has been detected, identifying information obtained by the TR from the user device may be utilized by the TR to associate the user device with a particular user of the SP. In another aspect, the identifying information may be used by the TR in messaging with the SP, and the SP makes the association of the user device with the particular user. The SP may then send a message to the TR containing the association information. Once an association of the detected user device with a particular user is known to the TR, the TR may obtain some or all of the UP corresponding to the user. The UP may be organized so that only information relevant to selecting advertising may be made available to a TR. The TR may access the UP by sending request messages, and receiving replies, from an SP or from a separate database.

In another aspect, the TR may be able to access a UP of a user associated to a detected device by accessing a version of the UP, or other information about the user, stored at the TR. For example, if a UP indicates that a user often patronizes a particular sports bar, a TR at that sports bar may store a local copy of the user's UP for efficiency in implementing the method in 400. The locally stored version of the UP may comprise a limited subset of the user data stored in a version of the user profile stored at the SP. In still another embodiment, the TR may receive for local storage a selected set of UPs from the SP, where the selection is based on whether a user associated to one of the UPs resides within a locality of the TR, or based on the preferences of the user. For example, if a user lives within one mile of a TR in a popular sports bar and the UP indicates the user enjoys sports, then it may be efficient for the TR in the sports bar to maintain a local copy of the UP. Other selection criteria may be used.

In the case that the TR has detected multiple user devices, the TR may be configured to access the UPs of the respective users associated with the devices. In one aspect, the TR may access the UPs of users associated with only a partial subset of all detected user devices. For example, to implement the following operations, a TR at a large sports bar may opt to use only an appropriate sampling UPs for ease of statistical calculations. In another access, at least one user of the SP may have indicated that his or her UP is not to be made available.

At 406, once a TR that has detected multiple user devices in its proximity and accessed the UPs of more than one of the users associated with the user devices may make use of information in the UPs to form a net demographic profile to associate with the multiple user devices. The net demographic profile may be used for selecting advertising content to display. The net demographic profile may represent an overall composite of information about the users. Non-limiting examples of information that may be included in the net demographic profile include the average age of the users, the gender ratio, average educational level, and average income level. The information in the net demographic profile may comprise statistical information for various data, for example the standard deviation of the ages, or a range of income levels. In additional and/or alternative embodiments, the determination of the net demographic profile may be performed by an SP using information provided by TR that has detected multiple user devices. In this embodiment, more details from the users' UPs may be accessible to the SP, and greater computational resources may be available.

Some data included in the net demographic profile may be determined by straightforward calculation from the information in the users' separate UPs, such as the average age. For information that is not quantifiable by a single axis, such as preference in genres of movies or brands of cars, more advanced multi-dimensional statistical techniques may be used to determine corresponding information to be included in the net demographic profile. For example, multiple dimensions may be used for determining a particular user's preferences in cars. When all the users' preferences in cars are obtained from the UPs, a principle component analysis may be performed to determine an overall general preference of the users. Such multidimensional analyses may involve more than one category of information, such as preferences in cars as well as preferences in sports. The net demographic profile may include information on a net preference with a category, such as food preferences, and also information on the strength of the correlation of the users' preference within a category. For example, the net demographic profile may show a weak overall preference among the users for compact cars, but a strong correlation for Italian food. As each UP may contain information about what the respective user dislikes or finds offensive, the net demographic profile may contain a union of such information. In this way the TR may ensure that no offensive advertising content is displayed.

At 408, advertising content may be selected for display. In one embodiment, the TR may perform the selection from advertising content stored locally at the TR. In another embodiment, the SP may select advertising based on the net demographic profile and other information. In a further embodiment the SP may select the advertising content and transmit the advertising content within the programming stream. The TR may then filter the selected advertising from the programming stream for output to the display. The ability to store advertising content locally and/or select advertising content in substantially real-time may allow for greater efficiency, flexibility and applicability in advertisements output for display by the TR.

The selection of the advertising content for display may use the information in the net demographic profile. Advertisements may be statistically correlated the various categories comprising the net demographic profile. For example, if the age range of the net demographic profile is from 20 years to 38 years, then there would be a negative correlation for advertisements for retirement homes, but a strong correlation for sporty cars. Advertisements with the strongest correlations may be preferentially chosen, and advertisements with negative correlations may be excluded entirely from selection for display. In addition to the net demographic profile information, the selection of advertising may make use of additional information, such as the particular nature of the establishment where the TR is located. For example, if the TR is located at a sports bar, and the net demographic profile indicated a preference for beer over wine among the users, beer advertisements could be preferentially selected over wine advertisements for display. In an alternate example, in the case that the TR is located in an airport lounge, travel advertisements could be preferentially selected over food advertisements.

Other information that may be used in the selection of advertising content is information about commercial establishments in the vicinity of the location of the TR. The advertising content may include advertisements for at least one such nearby commercial establishment. Such advertisements could be selected for display only at the location of the TR, when it is determined from information in the net demographic profile that there is a strong correlation between the interests of the detected users and the products of the commercial establishment. For example, since there are often book stores in airport concourses, when a net demographic profile of users located in an airport lounge indicated a strong net preference for reading books, the TR could select for display a locally stored advertisement for the particular book store in the airport concourse.

At 410, the selected advertising content is output for presentation by one or more display devices. In one embodiment, a display device may be a television communicatively linked with the TR. In additional and/or alternative embodiments the display device may be the user device itself. For example, if the TR also includes a local wireless link with at least one user's notebook computer, the selected advertising content could be output over the wireless link directly to the notebook computer. In another embodiment, the TR could inform the SP of the selected advertising content, which the SP could relay to a user device. For example, the SP could transmit the selected advertising content to a user's smartphone over a cellular phone connection.

In another embodiment, the selected advertising content could be transmitted to a dedicated advertising display device. For example, the display device could be a flat screen television mounted in a store window, and the advertising content selected appropriately for the users associated to a user devices determined to be in proximity of the flat screen television. The selected advertising content may be selected using information about the location of the dedicated advertising display device as well as information in an accessed UP.

While forming a single net demographic profile may often be useful for selecting advertising content for display, there may be situations where a single net demographic profile is not as advantageous. For example, if the TR is at an airport and provides video content both to a waiting area and inside a lounge, the preferences of the detected users in the two areas may differ. The following discloses a method that may be more advantageous for such a situation.

Figure 5:
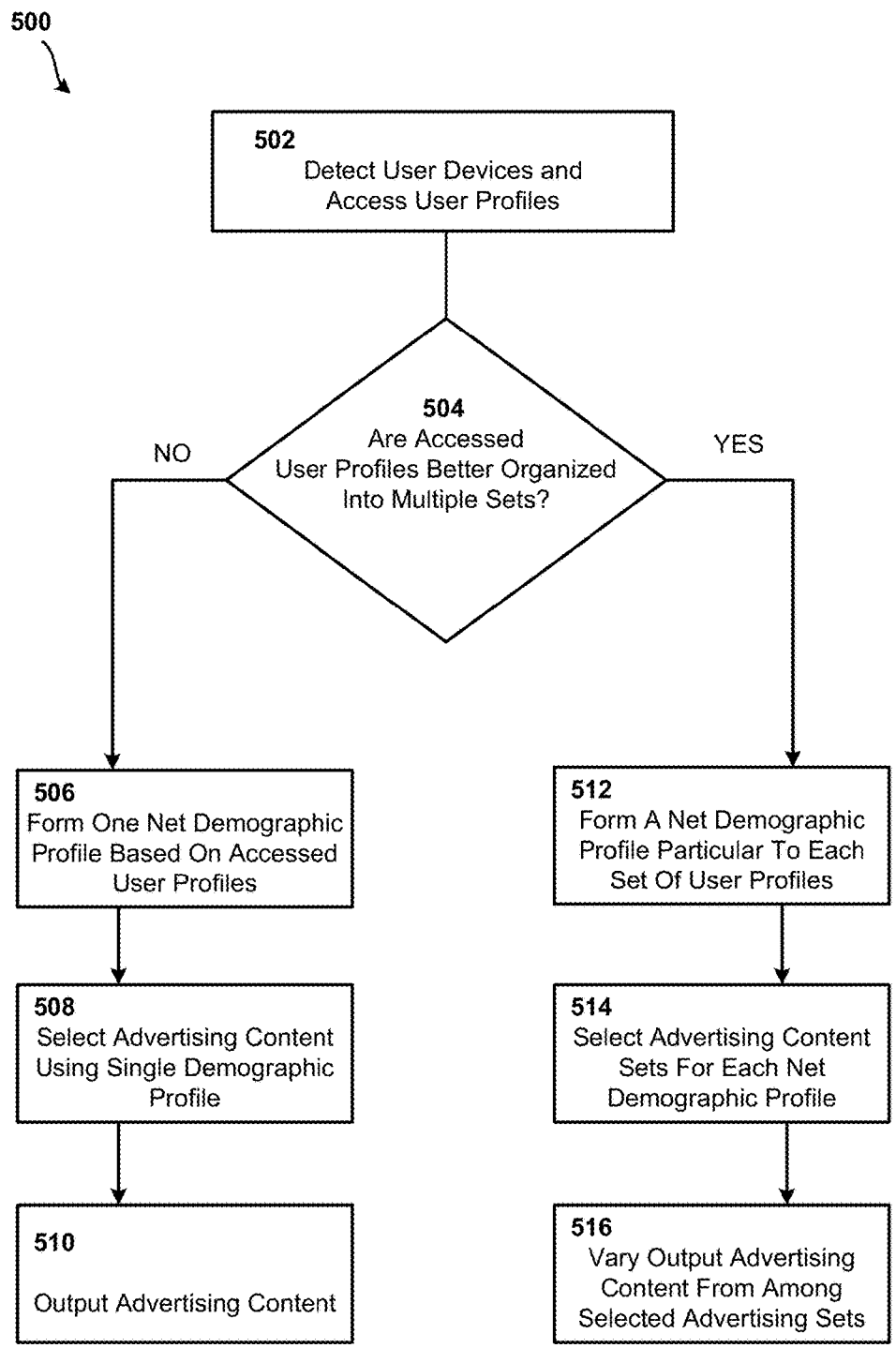
FIG. 5 shows a second example method in accordance with the present disclosure.

Referring now to FIG. 5, a second example method 500 is shown in accordance with the present disclosure. In particular, the method 500 provides an example implementation of or for by which targeted advertising may be delivered to multiple users at a location comprising a TR not associated with any of the users. The example method 500 may be applicable in situations when there are multiple display devices for different areas, or there are likely to be a large number of users with a variety of backgrounds.

At 502, a TR may detect multiple users. The detection may be performed by any of the ways disclosed previously. Following an initial detection of the multiple users, the UPs corresponding to a plurality of the detected users may be accessed. The accessing may be performed by the TR from information sent from the SP or from a local database of UPs, as disclosed above. Additionally and/or alternatively, the plurality of UPs may be accessed by the SP.

At 504, the information in the accessed UPs may be analyzed. This may comprise a statistical analysis of information contained in one or more categories of the UPs. For example, the distribution of ages and of the income levels of the UPs may be analyzed. In this example it may be observed that there are two clusters of ages. In such a situation a single net demographic profile may not be as useful for selecting advertising as two net demographic profiles—one for formed for each cluster of UPs—would be. One result of the analysis is that by organizing the UPs into multiple sets stronger correlation of interests may be detected. In the example just mentioned of two age clusters, a strong correlation may be observed in the cluster of the older users for travel activities, whereas in the cluster of young users there may be a strong correlation for sports cars. It may be that neither correlation would be detected by analyzing the entire group of users as a whole.

Thus in 504 a preliminary decision is made whether to organize the UPs into multiple sets. There may be two or more such sets. One factor for that may cause a decision to organize the UPs into multiple sets is an observed statistical clustering in a category of the UPs. One example might be a clustering of ages. Another might be a clustering of income levels. In another aspect, the method may initially organize the UPs by gender to see if stronger correlations of certain interests are found as compared to correlations found for those certain interests among the all the accessed UPs. In a further aspect, in the case that the UPs are determined to be better organized into multiple sets, two or more of the sets may have a nonempty intersection. A result of a preliminary analysis of the accessed UPs may be there is no reason to organize the UPs into multiple sets. In this situation, the method 500 proceeds to 506. In the alternative situation, the preliminary analysis determines that for selection of advertising the UPs may be better organized into multiple sets. In this case the method 500 branches to 512.

At 506, a single net demographic profile may be formed using information in all accessed UPs. The forming of the single net demographic profile may use any of the methods disclosed above in relation to 406, or by another method. At 508 the advertising content may be selected using the single net demographic profile, as disclosed above in relation to 408 or by another method. At 510 the selected advertising content may be output for display, as disclosed above in 410, or by another method.

At 512, in the situation in which the preliminary analysis determines that the UPs are better organized into multiple sets, for each particular set a respective net demographic profile is determined for each set based on information in the UPs in the particular set. The respective net demographic profile may be formed by any of the methods disclosed above in relation to 406, or by another method. In 514, respective advertising content may be selected for each respective net demographic profile, as disclosed above in relation to 408 or by another method. At 516 advertising content may be chosen and output for display from the various selections of respective advertising content. If there is more than one display device to which advertising can be output, and it is determined that there are more users associated with one of the sets in the viewing area of a particular display device, then the selected respective advertising for the set may be output to the particular display device. For example, if there are two sides to a large sports bar, with one side showing soccer and another side showing figure skating, it may be that the accessed UPs of the detected user devices cluster into two sets. Advertising appropriate for each set would be separately chosen, and output for display on the respective display device.

In another aspect, in 516, in the case that there is only one display device, but more than one set for which respective advertising content has been selected, the advertising actually output for display may alternate or rotate among the selections of respective advertising content. The relative frequency for the alternation or rotation may be reflect the sizes of the sets.

Figure 6:
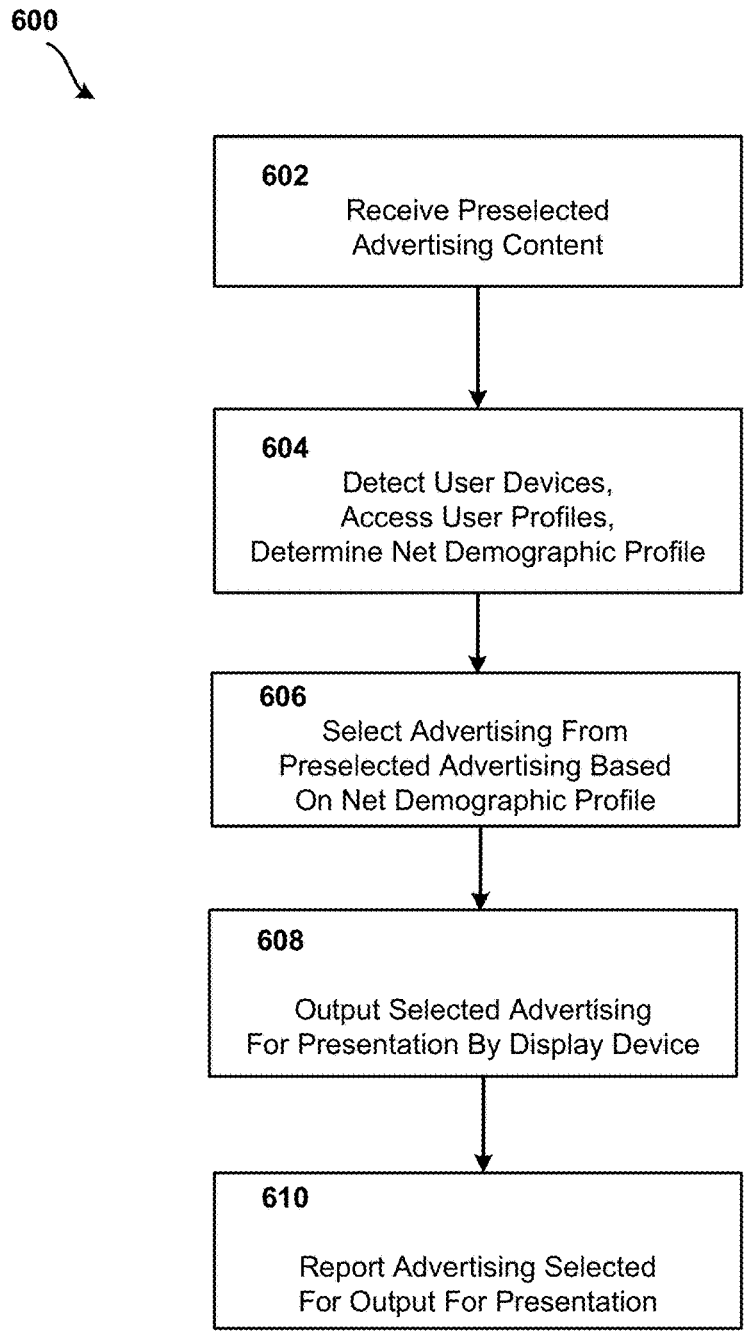
FIG. 6 shows a third example method in accordance with the present disclosure.

Referring now to FIG. 6, a third example method 600 is shown in accordance with the present disclosure. In particular, the method 600 provides an example implementation of or for by which targeted advertising content may be provided based on information specific to a TR. Such information may include the location of the TR, upcoming programming, and users or viewers likely to be in the proximity of the TR during the upcoming programming. As an example, a TR associated to a sports bar that scheduled to receive a skating competition one evening, and a championship football game the next evening, may use preselected advertising content during each program when that program is displayed. In this example, the TR may receive different advertising content prior to the skating competition than it receives prior to the football game.

At 602, a TR may receive preselected advertising content. In one embodiment, the preselected advertising content is received from a service provider. The preselected advertising content may be chosen on the basis of any combination of the location of the TR, programming scheduled to be shown in which the preselected advertising content is to be inserted, anticipated likely users who will view the display associated with the TR, or other criteria. In this way it may be possible for a TR as shown in FIG. 3 to have a local advertising database 306 that is smaller than the advertisement database 206 of the SP.

At 604, the TR may determine the presence of at least one user device in the proximity of the TR. The TR may then also access at least one UP associated with the at least one user device. In the case that multiple user devices are detected, the TR may then form a net demographic profile, as disclosed above in relation to FIG. 4. It may be that it is advantageous to organize the accessed UPs into multiple sets, and form respective net demographic profiles, as disclosed above in relation to FIG. 5.

At 606, advertising is selected based on a net demographic profile, and/or other information. The selection may be by a method disclosed above in relation to 408, or by another method. At 608 the advertising is output for presentation, by a method disclosed above in relation to 410, or by another method. At 610, the TR may send a report containing information about which particular advertising was selected from among the received preselected advertising content for output by the display. The report may be sent to the SP. One use of the report information may be for the SP to determine advertising fees. The report may also contain information relevant for updating a UP associated to a user device that was determined to be in the proximity of the TR.

In a further embodiment, a report sent by the TR may be sent to a SP during a program for which the preselected advertising was intended. The report may contain information from the UPs associated to the user devices determined to be in the proximity of the TR. The SP may then send to the TR updated advertising content. As an example, during a championship football game, a TR may send a report informing the SP that many users determined to be in the proximity of the TR enjoyed car repair. As a result of the report, the SP may send to the TR advertising content appropriate for such users.

Figure 7:
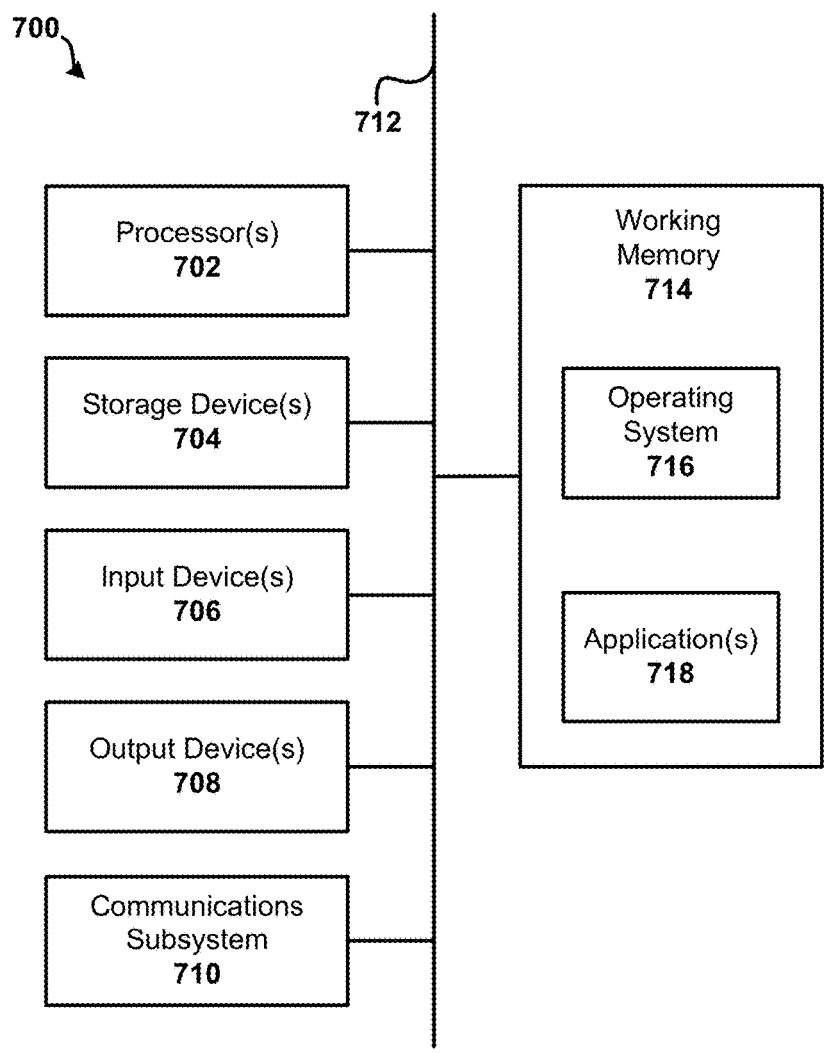
FIG. 7 shows an example of a computing system or device.

FIG. 7 shows an example of a computing system or device 700. The computer system 700 may be incorporated as part of one or more of the elements of the media content distribution system of FIG. 1. The computer device 700 may perform one or more steps, operations, modules, etc., of the methods of FIGS. 4-6. FIG. 7 is intended to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 712 (or may otherwise be in communication, as appropriate). The hardware elements may include one or more processors 702, including without limitation one or more general-purpose processors and/or one or more special-purpose processors (such as digital signal processing chips, graphics acceleration processors, and/or the like); one or more input devices 706, which can include without limitation a mouse, a keyboard, and/or the like; and one or more output devices 708, which may include without limitation a display device, a printer, and/or the like.

The computer device 700 may further include (and/or be in communication with) one or more non-transitory storage devices 704, which may comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 710 may permit data to be exchanged with a network (such as the network described below, to name one example), other computer systems, and/or any other devices described herein. In many embodiments, the computer device 700 will further comprise a working memory 714, which can include a RAM or ROM device, as described above.

The computer system 700 may also comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 704 described above. In some cases, the storage medium might be incorporated within a computer system, such as computer device 700. In other embodiments, the storage medium might be separate from a computer system (e.g., a removable medium, such as a compact disc), and/or provided in an installation package, such that the storage medium may be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer device 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, the computer system 700 may perform methods in accordance with various embodiments of the disclosure. For example, some or all of the procedures of such methods are performed by the computer device 700 in response to processor 702 executing one or more sequences of one or more instructions (which might be incorporated into the operating system 716 and/or other code, such as an application program 718) contained in the working memory 714. Such instructions may be read into the working memory 714 from another computer-readable medium, such as one or more of the non-transitory storage device(s) 704. Merely by way of example, execution of the sequences of instructions contained in the working memory 714 might cause the processor(s) 702 to perform one or more procedures of the methods described herein.

The terms "machine-readable medium" and "computer-readable medium," as used herein, refer to any non-transitory medium that participates in providing data that causes a machine to operate in a specific fashion. In some embodiments implemented using the computer system 700, various computer-readable media might be involved in providing instructions/code to processor(s) 702 for execution and/or might be used to store and/or carry such instructions/code.

In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 704. Volatile media include, without limitation, dynamic memory, such as the working memory 714.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 702 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer device 700.

The communications subsystem 710 (and/or components thereof) generally may receive signals, and the bus 712 then might carry the signals (and/or the data, instructions, etc. carried by the signals) to the working memory 714, from which the processor(s) 702 retrieves and executes the instructions. The instructions received by the working memory 714 may optionally be stored on a non-transitory storage device 704 either before or after execution by the processor(s) 702.

It should further be understood that the components of computer system 700 may be distributed across a network. For example, some processing may be performed in one location using a first processor while other processing may be performed by another processor remote from the first processor. Other components of computer device 700 may be similarly distributed.

Figure 8:
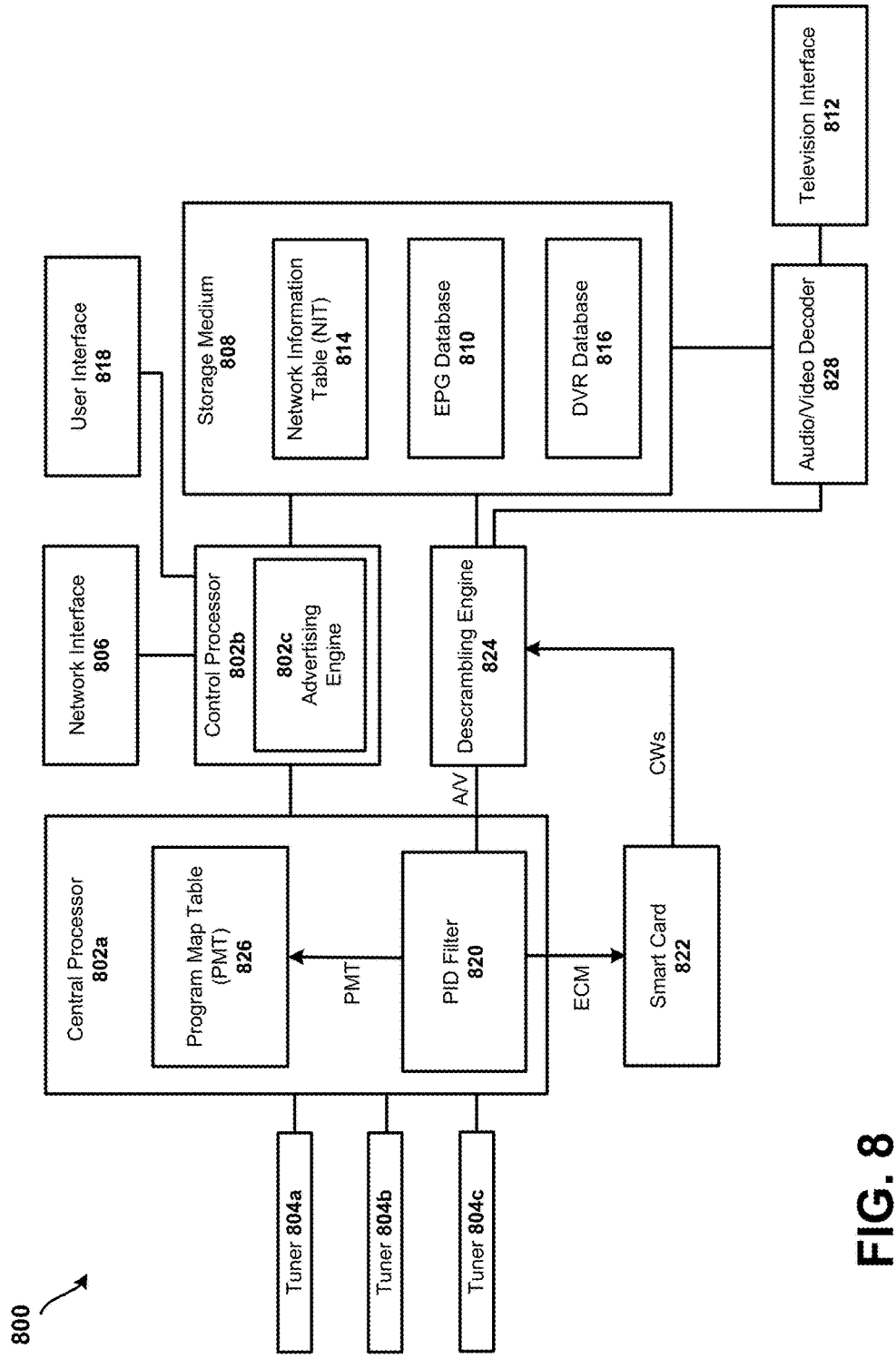
FIG. 8 shows a simplified block diagram of a television receiver of FIG. 1.

Referring now to FIG. 8, a simplified block diagram of the PTR 110 of FIG. 1 is shown in accordance with the present disclosure. For brevity, the following description refers to the PTR 110 but is to be understood as also describing some elements that may also be present in a secondary television receiver 112*a-b*. For brevity, the PTR 110 is depicted in a simplified and conceptual form, and may generally include more or fewer elements or components as desired in accordance with the present disclosure. For example, the PTR 110 is shown in FIG. 8 to include the advertisement selection module 126*b*. Additionally, although not explicitly shown in FIG. 8, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such a functionality. Additionally, the PTR 110 may be configured to include any number of other various components or logical modules that are implemented in hardware, software, firmware, or any combination thereof, and such components or logical modules may or may not be implementation-specific.

In some embodiments, the PTR 110 and/or the secondary television receivers 112*a-b* comprise of a STB. In addition to being in the form of an STB, at least the PTR 110 may be incorporated into another device, such as the television 114*c*. For example, the television 114*c* may have an integrated television receiver that does not involve an external STB being coupled with the television 114*c*. A STB may contain some or all of the components of the PTR 110 and/or may be able to perform some or all of the functions of the PTR 110. Accordingly, instances in this document referring to a STB, and steps being performed by a STB, may also be performed, more generally, by the PTR 110 and/or secondary television receivers 112*a-b*.

Referring still to FIG. 8, the PTR 110 may be configured to record omnibus channel files and extract a television program from a recorded omnibus channel file, and may include the content management engine 118 as shown in FIG. 2, at least one processor 802, including a central processor 802*a* and a control processor 802*b*, an advertising engine 802*c*, which may be configured to implement the advertisement selection module 126*b*, a plurality of tuners 804*a-c*, at least one network interface 806, at least one non-transitory computer-readable storage medium 808, at least one EPG database 810, at least one television interface 812, at least one NIT (Networking Information Table) 814, at least one DVR database 816, at least one user interface 818, at least one PID filter 820, at least one smart card 822, at least one descrambling engine 824, at least one PMT (Program Map Table) 826, at least one decoder 828 and a catalogue database 330. In other embodiments of the PTR 110, fewer or greater numbers of components may be present. Further, functionality of one or more components may be combined; for example, functions of the descrambling engine 824 may be performed by the central processor 802*a*. Still further, functionality of components may be spread among additional components. For example, the PID filter 820 may be handled by hardware and/or software separate from the PMT 826.

The processor 802 may include one or more specialized and/or general-purpose processors configured to perform processes such as tuning to a particular channel, accessing and displaying EPG information from the EPG database 810, and/or receiving and processing input from a user. For example, processor 802 may include one or more processors dedicated to decoding video signals from a particular format, such as MPEG (Moving Picture Experts Group), for output and display on a television and for performing decryption.

The control processor 802*b* may communicate with the central processor 802*a*. The control processor 802*b* may control the recording of television channels based on timers stored in the DVR database 816. The control processor 802*b* may initiate recording of a television channel by sending a record command along with an indication of the television channel to be recorded to the central processor 802*a*. The control processor 802*b* may not send a second record command, when additional recording is to begin at the same time, until an acknowledgement that recording of the first television channel has successfully been received and initiated by the central processor 802*a*. The control processor 802*b* may also provide commands to the central processor 802*a* when recording of a television channel is to cease. In addition to providing commands relating to the recording of television channels, the control processor 802*b* may provide commands to the central processor 802*a* that indicate television channels to be output to the decoder 828 for output to a presentation device, such as the television 114*c* for example.

The control processor 802b may also communicate with the network interface 806 and the user interface 318. The control processor 302b may handle in-coming data from the network interface 806 and the user interface 818. Additionally, the control processor 802b may be configured to output data via the network interface 806.

The tuners 804a-c may be used to tune to television channels, such as television channels transmitted via satellite or cable, such as satellites 106a-c. Each respective one of the tuner 804a-c may be capable of receiving and processing a single stream of data from a satellite transponder, or a cable RF channel, at a given time. As such, a single tuner may tune to a single transponder or, for a cable network, a single cable RF channel. Additionally, one tuner (e.g., tuner 804a) may be used to tune to a television channel on a first transponder stream for display using a television, while another tuner (e.g., tuner 804b) may be used to tune to a television channel on a second transponder for recording and viewing at some other time. Still another tuner (e.g., tuner 804c) may be used to check various television channels to determine if they are available or not. If multiple television channels transmitted on the same transponder stream are desired, a particular tuner (e.g., tuner 804a) may be used to receive the signal containing the multiple television channels for presentation and/or recording. The tuners 804a-c may receive commands from the central processor 802a. Such commands may instruct the tuners 804a-c which frequencies are to be used for tuning.

The network interface 806 may be used to communicate via an alternate communication channel with a service provider. For example, the primary communication channel may be via satellite, which may be unidirectional to the STB, and the alternate communication channel, which may be bi-directional, may be via a network, such as the Internet. The PTR 110 may be able to communicate with the service provider 102 of FIG. 1 via a network, such as the Internet. This communication may be bidirectional. For example, data may be transmitted from the PTR 110 to the service provider 102, and from the service provider 102 to the PTR 110. The network interface 806 may be configured to communicate via one or more networks, such as the Internet, to communicate with the service provider 102. Information may be transmitted and/or received via the network interface 806.

The storage medium 808 may represent a non-transitory computer-readable storage medium. The storage medium 808 may include memory and/or a hard drive. The storage medium 808 may be used to store information received from one or more satellites and/or information received via the network interface 806. The storage medium 808 may store information related to the EPG database 810, the NIT 814, and/or the DVR database 816. Recorded television programs may be stored using the storage medium 808. The storage medium 808 may be partitioned or otherwise divided such that predefined amounts of the storage medium 808 are devoted to storage of omnibus channel files and user-selected television programs.

The EPG database 810 may store information related to television channels and the timing of programs appearing on such television channels. The EPG database 810 may be stored using the storage medium 808, which may be a hard drive. Information from the EPG database 810 may be used to inform users of what television channels or programs are popular and/or provide recommendations to the user. Information from the EPG database 810 may provide the user with a visual interface displayed by a television that allows a user to browse and select television channels and/or television programs for viewing and/or recording. Information used to populate the EPG database 810 may be received via the network interface 806 and/or via satellites, such as satellites 106a-c of FIG. 1 via the tuners 804a-c. For instance, updates to the EPG database 810 may be received periodically via satellite. The EPG database 810 may serve as an interface for a user to control DVR functions of the PTR 110, and/or to enable viewing and/or recording of multiple television channels simultaneously.

In addition to being used to provide users with information about scheduled programming, information from the EPG database 810 may be used to determine when television programs begin and end for the purposes of recording. For instance, when a channel-specific file is recorded that contains multiple television channels, the start and end of time of specific television programs within the channel-specific file may be based on the start and end times indicated in the EPG database 810. Other data may be stored within the EPG database 810 that may be useful in managing channel-specific files, such as series identifiers and episode identifiers, which may be used by a service provider to identify particular television programs.

The decoder 828 may serve to convert encoded video and audio into a format suitable for output to a display device. For instance, the decoder 828 may receive MPEG video and audio from the storage medium 808, or the descrambling engine 824, to be output to a television. MPEG video and audio from the storage medium 808 may have been recorded to the DVR database 816 as part of a previously-recorded television program. The decoder 828 may convert the MPEG video and audio into a format appropriate to be displayed by a television or other form of display device and audio into a format appropriate to be output from speakers, respectively.

The television interface 812 may serve to output a signal to a television, or another form of display device, in a proper format for display of video and playback of audio. As such, the television interface 812 may output one or more television channels, stored television programming from the storage medium 808, such as television programs from the DVR database 816 and/or information from the EPG database 810 for example, to a television for presentation.

The NIT 814 may store information used by the PTR 110 to access various television channels. The NIT 814 may be stored using the storage medium 808. Information used to populate the NIT 814 may be received via satellite, or cable, via the tuners 804a-c and/or may be received via the network interface 806 from a service provider. As such, information present in the NIT 814 may be periodically updated. The NIT 814 may be locally-stored by the PTR 110 using the storage medium 808. Information that may be present in the NIT 814 may include, for example: television channel numbers, a satellite identifier, a frequency identifier, a transponder identifier, an ECM (Entitlement Control Message) PID (Packet Identifier), one or more audio PIDs, and a video PID. A second audio PID of a channel may correspond to a SAP (Second Audio Program) program, such as in another language. In some embodiments, the NIT 814 may be divided into additional tables. For example, rather than the specific audio PIDs and video PIDs being present in the NIT 814, a channel identifier may be present within NIT 814 which may be used to look up the audio PIDs and video PIDs in another table, such as the PMT 826. For example, the PMT 826 may store information on audio PIDs and video PIDs for television channels that are transmitted on a transponder frequency.

Table 1 below provides a simplified example of the NIT 814 for several television channels. It should be understood that in other embodiments, many more television channels may be represented in the NIT 814. The NIT 814 may be at least periodically updated by a service provider. As such, television channels may be reassigned to different satellites and/or transponders, and the PTR 110 may be able to handle this reassignment as long as the NIT 814 is updated.

TABLE 1

| Channel | Satellite | Transponder | ECM PID | PMT PID |
|---------|-----------|-------------|---------|---------|
| 4       | 1         | 2           | 27      | 1001    |
| 5       | 2         | 11          | 29      | 1002    |
| 7       | 2         | 3           | 31      | 1001    |
| 13      | 2         | 4           | 33      | 1004    |

Based on information in the NIT 814, it may be possible to determine the proper satellite and transponder to which to tune for a particular television channel. In some embodiments, the NIT 814 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 814. Additional information on how the NIT 814, as indicated in Table 1, may be used is provided in reference to FIG. 3. The same PID may be reused on different transponders.

A DVR may permit a television channel to be recorded for a period of time. DVR functionality of the PTR 110 may be managed by the control processor 802*b*. The control processor 802*b* may coordinate the television channel, start time, and stop time of when recording of a television channel is to occur. The DVR database 816 may store information related to the recording of television stations. The DVR database 816 may store timers that are used by the control processor 802*b* to determine when a television channel should be tuned to and its programs recorded to the DVR database 816. However, other embodiments are possible. For example, in some embodiments, the storage medium 808 may store timers. Timer files may be defined as a daily_schedule_db.dat file and a gloal_timer_db.dat file. In general, when a "new" timer is created, a "new" entry may be added into the daily_schedule_db.dat and gloal_timer_db.dat files, which may include all timer related information such as channel number, start time, duration, etc. Further, a limited amount of the storage medium 808 may be devoted to the DVR database 816. Timers may be set by a service provider and/or one or more users of the PTR 110.

DVR functionality of the control processor 802*b* may have multiple modes. For example, DVR functionality of the control processor 802*b* may be configured to record individual television programs selected by a user to the DVR database 816. Using the EPG database 810, a user may select a particular television program. Based on the date, time period, and television channel indicated by the EPG database 810, the control processor 802*b* may record the associated television program to the DVR database 816. In another example, the DVR database 816 may be used to store recordings of predefined periods of time on one or more television channels. These predefined periods of time may include one or more television programs. For example, Primetime on a particular television network may be recorded each weekday night. Further, multiple television channels may be recorded for such predefined periods of time. Such recording of television channels for predefined periods of time may be defined by a service provider (e.g., service provider 102).

As an example of this second mode of DVR functionality, a service provider may configure the PTR 110 to record television programming on multiple, predefined television channels for a predefined period of time, on predefined dates. For instance, a service provider may configure the PTR 110 such that television programming may be recorded from 7 PM to 10 PM on the NBC, ABC, CBS, and FOX networks each weeknight. When a television program is selected for recording by a user and is also specified for recording by the service provider, the user selection may serve as an indication to save the television program for an extended time, beyond the time which the predefined recording would otherwise be saved.

Whether recording is performed based on a user-selected television program or selection by a service provider, selection may result in storage by DVR database 816 being managed differently. Separate storage arrangements, such as separate partitions on the same storage device, may be allocated based on which entity designated the television program/channel for recording. As such, the DVR database 816 may use multiple storage arrangements, such as multiple partitions on the storage medium 808. Television programming recorded based on a service provider selection may be stored on a first storage arrangement. Television programming recorded based on user selection may be stored on a second storage arrangement. Television programming on the first storage arrangement may automatically be deleted after a predefined period of time, such as two weeks. If a television program stored by the first storage arrangement is selected by a user (such as via a displayed EPG) to be saved, the television program may be transferred from the first storage arrangement to the second storage arrangement, such as when the television programming would otherwise be deleted from the first storage arrangement.

The user interface 818 may include a remote control, physically separate from PTR 110, and/or one or more buttons on the PTR 110 that allows a user to interact with the PTR 110. The user interface 818 may be used to select a television channel for viewing, view information from the EPG database 810, and/or program a timer stored to the DVR database 816 wherein the timer may be used to control the DVR functionality of the control processor 802*b*.

Referring back to tuners 804*a-c*, television channels received via satellite, or cable, may contain at least some scrambled data. Packets of audio and video may be scrambled to prevent unauthorized users, such as nonsubscribers, from receiving television programming without paying the television service provider. When one of the tuners 804*a-c* is receiving data from a particular transponder of a satellite, the transponder stream may be a series of data packets corresponding to multiple television channels. Each data packet may contain a PID, which, in combination with the NIT 814 and/or the PMT 826, can be determined to be associated with particular television channel. Particular data packets, referred to as ECMs may be periodically transmitted. ECMs may be associated with another PID and may be encrypted; the PTR 110 may use the smart card 822 to decrypt ECMs. Decryption of an ECM may only be possible when the user (e.g., PTR 110) has authorization to access the particular television channel associated with the ECM.

When an ECM is determined to correspond to a television channel being stored and/or displayed, the ECM may be provided to the smart card 822 for decryption.

When the smart card 822 receives an encrypted ECM, the smart card 822 may decrypt the ECM to obtain some number of control words. In some embodiments, from each ECM received by the smart card 822, two control words are obtained. In some embodiments, when the smart card 822 receives an ECM, it compares the ECM to the previously received ECM. When the two ECMs match, the second ECM is not decrypted because the same control words would be obtained. In other embodiments, each ECM received by the smart card 822 is decrypted; however, when a second ECM matches a first ECM, the outputted control words will match; thus, effectively, the second ECM does not affect the control words output by the smart card 822. The smart card 822 may be permanently part of the PTR 110 or may be configured to be inserted and removed from PTR 110.

The central processor 802*a* may be in communication with the tuners 804*a-c* and the control processor 802*b*. The central processor 802*a* may be configured to receive commands from the control processor 802*b*. Such commands may indicate when to start/stop recording a television channel and/or when to start/stop causing a television channel to be output to a television. The central processor 802*a* may control the tuners 804*a-c*. The central processor 802*a* may provide commands to the tuners 804*a-c* that instruct the tuners which satellite, transponder, and/or frequency to tune to. From the tuners 804*a-c*, the central processor 802*a* may receive transponder streams of packetized data. As previously detailed, some or all of these packets may include a PID that identifies the content of the packet.

The central processor 802*a* may be configured to create at least one PID filter 820 that sorts packets received from the tuners 804*a-c* based on the PIDs. When a tuner is initially tuned to a particular frequency, such as a particular transponder of a satellite, a PID filter may be created based on a PID of PMT data. The PID of PMT data packets may be known because it is stored as part of the NIT 814. From the PMT data packets, the PMT 826 may be constructed by central processor 802*a*. Table 2 below provides an exemplary snapshot of a PMT. The PMT 826 may be specific to a particular transponder. As such, when tuning to a different transponder occurs, a new PMT may be created for the different transponder.

TABLE 2

| Channel | Video PID | 1$^{st}$ Audio PID | 2$^{nd}$ Audio PID |
|---------|-----------|--------------------|--------------------|
| 4       | 1003      | 2383               | 2119               |
| 5       | 2993      | 2727               | 2728               |
| 7       | 9238      | 1233               | 0129               |
| 13      | 0012      | 9348               | —                  |

Accordingly, based on the information present in the PMT 826, the audio and video PIDs for specific television channels may be identified. A television channel may have multiple audio PIDs due to a second audio program, which may be in a different language. It should be understood that the values provided in Table 2 are for example purposes only. Actual values may vary. Additional information or less information may also be stored in the PMT 826.

The PID filter 820 may be configured to filter data packets based on PIDs. In some embodiments, the PID filter 820 is created and executed by central processor 802*a*. In other embodiments, separate hardware may be used to create and execute multiple PID filters. Depending on a television channel selected for recording/viewing, a PID filter may be created to filter the video and audio packets associated with the television channel, based on the PID assignments present in the PMT 826. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 824 or the smart card 822; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 814, may be appropriately routed by the PID filter 820. At a given time, one or multiple PID filters may be executed by the central processor 802*a*.

The descrambling engine 824 may use the control words output by the smart card 822 in order to descramble video and/or audio corresponding to television channels for storage and/or presentation Video and/or audio data contained in the transponder data stream received by the tuners 804*a-c* may be scrambled. Video and/or audio data may be descrambled by descrambling engine 324 using a particular control word. Which control word output by the smart card 822 to be used for successful descrambling may be indicated by a scramble control identifier present within the data packet containing the scrambled video or audio. Descrambled video and/or audio may be output by the descrambling engine 824 to the storage medium 808 for storage in the DVR database 816 and/or to the decoder 828 for output to a television or other presentation equipment via the television interface 812.

For simplicity, the PTR 110 of FIG. 1 has been reduced to a block diagram; commonly known parts, such as a power supply, have been omitted. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules. Further, the components of the PTR 110 may be part of another device, such as built into a television. Also, while the PTR 110 may be used to receive, store, and present television channels received via a satellite, it should be understood that similar components may be used to receive, store, and present television channels via a cable network.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    detecting during an individual time window, by a computing system, presence of multiple user devices within a proximity of the computing system at a particular location;
    accessing, during the individual time window, for each particular user device of a plurality of user devices of the multiple user devices, a user profile that is associated with the particular user device;
    analyzing, at a specific time during the individual time window, demographic information in the accessed user profiles;
    compiling, at the specific time, demographic categories comprising the demographic information from the accessed user profiles;
    identifying multiple clusters of user profiles included in the demographic categories from the multiple user devices detected during the individual time window, wherein a cluster comprises multiple user profiles where users associated with the multiple user profiles have a common characteristic from the demographic category;
    organizing, during the specific time, the accessed user profiles into multiple sets each including at least two user profiles, wherein each set of the multiple sets is associated with an identified cluster of user profiles;
    for a first set of the multiple sets, determining a first net demographic profile based on a first identified cluster;
    for a second set of the multiple sets, determining a second net demographic profile based on a second identified cluster different from the first identified cluster;
    outputting for presentation during the individual time window by a first display device at a particular location first advertising content selected based upon the first net demographic profile;
    simultaneously outputting for presentation during the individual time window by a second display device at the particular location second advertising content selected based upon the second net demographic profile;
    detecting a changed presence of multiple user devices as a result of either entry into the proximity of the computing system of a device not initially among the multiple user devices, or an exit from the proximity of the computing system of a device initially among the multiple user devices;
    accessing at least one user profile, wherein each particular user profile of the at least one accessed user profile is associated with a particular user device among the changed presence of multiple user devices;
    updating one or both of the first net demographic profile and the second net demographic profile using information in the accessed at least one user profile; and
    selecting advertising content for presentation by one or both of the first display device and the second display device based upon the updating.

2. The computer-implemented method of claim 1, wherein the selecting the advertising content comprises selecting the advertising content for presentation by the one or both of the first display device and the second display device from particular advertising content that is stored on the computing system.

3. The computer-implemented method of claim 2, further comprising receiving the particular advertising content prior to a transmission of a program during which the selected advertising content is presented by one or both of the first display device and the second display device.

4. The computer-implemented method of claim 2, wherein the advertising content is selected based on a geographic location of the computing system.

5. The computer-implemented method of claim 1, wherein the advertising content is selected from particular advertising content being received by the computing system.

6. The computer-implemented method of claim 1, further comprising transmitting from the computing system to a service provider information for updating of the accessed at least one user profile.

7. The computer-implemented method of claim 1, further comprising transmitting from the computing system to a service provider information identifying the selected advertising content to obtain compensation for selection of the advertising content.

8. A television receiver, comprising:
    one or more processors;
    an advertising selection module; and memory containing instructions that when executed by the one or more processors cause the advertising selection module to:
  detect during an individual time window presence of multiple user devices within a proximity of the television receiver;
  access, at a particular time within the individual time window, for each particular user device of a subset that includes at least two of the multiple user devices but less than a total number of the multiple user devices, a user profile for each particular user device of the subset;
  generate, at the particular time within the individual time window, a demographic composite from demographic information accessed from the user profiles;
  determine, at the particular time within the individual time window, at least two demographic categories from the demographic composite having a similar characteristic from at least a subset of the user profiles;
  organize, at the particular time within the individual time window, the accessed user profiles into at least two sets, each set including at least two user profiles, wherein each one of the at least two sets is respectively associated with one of the at least two demographic categories;
  select separate advertising content for presentation by at least two display devices based upon the demographic categories;
  output simultaneously for presentation during the individual time window a first advertising content for presentation by at least one of the at least two display devices corresponding to a first of the at least two demographic categories and second advertising content for presentation by at least one other of the at least two display devices corresponding to a second of the at least two demographic categories;
  detect a changed presence of multiple user devices as a result of either entry into the proximity of the television receiver of a device not initially among the multiple user devices, or an exit from the proximity of the television receiver of a device initially among the multiple user devices;
  access at least one user profile, wherein each particular user profile of the at least one accessed user profile is associated with a particular user device among the changed presence of multiple user devices;
  update a net demographic profile using information in the accessed at least one user profile; and
  select advertising content for presentation by at least one of the two display devices based upon the updated net demographic profile.

9. The television receiver of claim 8, wherein the memory further contains instructions that when executed by the one or more processors cause the television receiver to output for presentation by the at least one of the two display devices the selected advertising content.

10. The television receiver of claim 8, wherein the advertising content is selected from particular advertising content stored in a local database of the television receiver.

11. The television receiver of claim 10, wherein the memory further contains instructions that when executed by the one or more processors cause the advertising selection module to detect receipt of the particular advertising content prior to a transmission of a program during which the selected advertising content is presented by the at least one of the two display devices.

12. The television receiver of claim 8, wherein the advertising content is selected based on a location of the television receiver.

13. The television receiver of claim 8, wherein the memory further contains instructions that when executed by the one or more processors cause the advertising selection module to transmit from the television receiver to a service provider information for updating at least one of the accessed user profiles.

14. The television receiver of claim 8, wherein the memory further contains instructions that when executed by the one or more processors cause the advertising selection module to transmit to a service provider information about the selected advertising content.

15. A television receiver of claim 8, wherein the accessed at least one user profile is a local user profile transmitted from the particular user device.

16. A non-transitory, processor-readable medium comprising processor-readable instructions to cause one or more processors to:
  receive broadcast content from a television services provider;
  detect at a particular time presence of multiple user devices within a proximity of a television receiver;
  access, at the particular time, from a database of the television services provider, for each particular user device of a subset of at least two of the multiple user devices, a user profile that is associated with each particular user device, wherein the user profiles are for subscribers of the television services provider;
  generate, at the particular time, a demographic composite from demographic information accessed from the user profiles;
  determine, at the particular time, at least two demographic categories from the demographic composite each having a similar characteristic from at least a subset of the user profiles;
  organize, at the particular time, the accessed user profiles into at least two sets, each set including at least two user profiles, wherein each one of the at least two sets is respectively associated with one of the at least two demographic categories;
  select, at the particular time, separate advertising content for presentation by at least two display devices based upon the demographic categories;
  output simultaneously for presentation during the particular time a first advertising content for presentation by at least one of the at least two display devices corresponding to a first of the at least two demographic categories and second advertising content for presentation by at least one other of the at least two display devices corresponding to a second of the at least two demographic categories;
  detect at another time following the particular time a changed presence of multiple user devices as a result of either of an entry into the proximity of the television receiver of a user device not initially among the multiple user devices, or an exit from the proximity of the television receiver of a user device initially among the multiple user devices;
  access at least one user profile, wherein each particular user profile of the at least one accessed user profile is associated with a particular user device among the changed presence of multiple user devices;
  update at least one of the demographic categories or the demographic composite using information in the accessed user profiles;

select advertising content for presentation by at least one of the display devices based upon the updated at least one of the demographic categories or the demographic composite;

output for presentation by the at least one of the display devices the selected advertising content;

detect a changed presence of multiple user devices as a result of either entry into the proximity of the television receiver of a device not initially among the multiple user devices, or an exit from the proximity of the television receiver of a device initially among the multiple user devices;

access at least one user profile, wherein each particular user profile of the at least one accessed user profile is associated with a particular user device among the changed presence of multiple user devices;

update a net demographic profile using information in the accessed at least one user profile; and select advertising content for presentation by at least one of the display devices based upon the updated net demographic profile.

17. The computer-implemented method of claim 1, wherein each operation of the computer-implemented method is performed by a television receiving device.

18. The computer-implemented method of claim 1, wherein the detecting presence of the multiple user devices comprises receiving a user identifier from each of the multiple user devices, and wherein the accessing the user profiles further comprises:

sending a user identifier to a service provider, and receiving demographic information for a subscriber associated with the user identifier from the service provider.

* * * * *